United States Patent Office 3,428,648
Patented Feb. 18, 1969

3,428,648
3-(SUBSTITUTED PHENYL) PYRROLE DERIVATIVES AND METHODS OF PRODUCING THEM
Suminori Umio, Kawanishi, Kazuo Kariyone, Kyoto, and Kunihiko Tanaka, Osaka, Japan, assignors to Fujisawa Pharmaceutical Co., Ltd., Osaka, Japan, a company of Japan
No Drawing. Continuation-in-part of applications Ser. No. 489,412, Ser. No. 489,413, Ser. No. 489,429, and Ser. No. 489,432, Sept. 22, 1965. This application Mar. 20, 1967, Ser. No. 624,139
Claims priority, application Japan, Oct. 12, 1964, 39/58,242; Oct. 22, 1964, 39/60,200; Dec. 7, 1964, 39/68,740, 40/17,732; Dec. 24, 1964, 39/73,138; Feb. 2, 1965, 40/5,814; Apr. 8, 1965, 40/20,733
U.S. Cl. 260—313.1                21 Claims
Int. Cl. C07d 27/20; A61k 27/00

ABSTRACT OF THE DISCLOSURE

The derivatives are halo, nitro or alkoxy phenyl pyrroles which are useful as fungicide for medicinal and agricultural applications and/or as key intermediates in the preparation of pyrrolnitrin which is produced by fermentation and which is particularly efficacious in the treatment of athlete's foot. Efficient methods are also proposed for production of the derivatives.

CROSS-REFERENCES TO RELATED APPLICATIONS

This application is a continuation-in-part of the copending applications S.N. 489,412 filed on Sept. 22, 1965, now U.S. Patent No. 3,367,944; S.N. 489,413; S.N. 489,-429; and S.N. 489,432, all filed on Sept. 22, 1965 now all abandoned.

BACKGROUND OF THE INVENTION

The invention relates generally to phenyl pyrrole derivatives and more particularly to 3-(substituted phenyl) pyrroles in which the substituent may be one or more halogen, nitro or lower alkoxy. The pyrrole nucleus of the compound may be substituted by different groups.

Arima et al. of Japan disclosed in Agricultural and Biological Chemistry, vol. 28, No. 8, Aug. 19, 1964, pp. 575–578, the fermentation of a culture medium with certain strains of pseudomonas to produce pyrrolnitrin which is also called 3-(2-nitro-3-chlorophenyl)-4-chloropyrrole. This fermentation production is described in U.S. patent application 440,747, filed Mar. 18, 1965 now abandoned. The pyrrolnitrin of Arima et al. has a recognized utility for the treatment of athlete's foot and as a fungicide in agriculture.

SUMMARY

The compounds of this invention are substituted pyrroles of the formula:

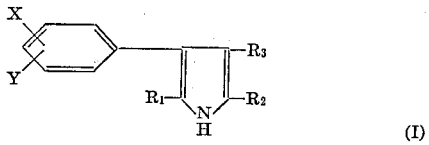

(I)

in which X is hydrogen, halogen, nitro or lower alkoxy; Y is halogen, nitro or lower alkoxy; $R_1$ is hydrogen, lower alkyl, trihalomethyl, carboxyl or —$COOR_4$ in which $R_4$ is lower alkyl or aralkyl; $R_2$ is hydrogen, lower alkyl, trihalomethyl, carboxyl or —$COOR_5$ is which $R_5$ is lower alkyl or lower aralkyl; and $R_3$ is hydrogen or halogen, provided that when X is nitro, Y chlorine, $R_1$ hydrogen, $R_2$ hydrogen and $R_3$ a halogen, that halogen is fluorine, bromine or iodine and provided further that when one of $R_1$ and $R_2$ is trihalomethyl, the other is trihalomethyl, —$COOR_4$ or —$COOR_5$ and $R_3$ is halogen.

The compounds of this invention are useful as fungicides and/or as intermediates in the production of 3-(2-nitro-3-chlorophenyl)-4-chloropyrrole which has extremely high activity against fungi, particularly Trichophyton. The compounds useful as fungicide may be employed in agriculture in the form of the spray for the destruction of fungi or in the treatment of mammals for infections by microorganisms, such as Trichophyton asteroides.

A fungicide spray for agricultural uses may be a solution or emulsion of the compound in a concentration of 0.01–3 parts to about 100 parts of a suitable inert non-toxic solvent or an inert non-toxic carrier and an emulsifier. For uses in treatment of infection of mammals, tinctures, ointments or spray solutions can be conveniently employed. For typical applications, a concentration of 0.25–3% of the composition is satisfactory. The compounds used as intermediates for the production of 3-(2-nitro-3-chlorophenyl)-4-chloropyrrole can be converted to the desired compound by methods which would replace by hydrogen any group or element other than hydrogen in the 2- and 5-positions of the pyrrole nucleus and substitute chlorine for any group other than chlorine in the 4-position of the pyrrole nucleus.

Each of the compounds of this invention may be produced by one or more of four methods. The methods differ from each other in the reactions which each utilizes. These reactions are:

(1) Decarboxylation with heating;
(2) Halogenation;
(3) Solvolysis; and
(4) Ring-closure.

METHOD OF PREPARATION INVOLVING DECARBOXYLATION WITH HEATING

Certain 3-(substituted phenyl) pyrrole compounds of this invention may be produced by a method involving decarboxylation with heating. Such compounds have the Formula II:

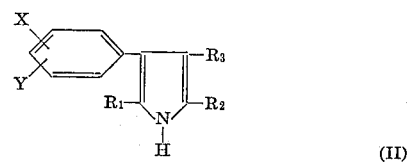

(II)

in which X is hydrogen, halogen, nitro or lower alkoxy; Y is halogen, nitro or lower alkoxy; $R_1$ is hydrogen, lower alkyl or esterified carboxyl; $R_2$ is hydrogen, alkyl or esterified carboxyl; $R_3$ is hydrogen or halogen; provided at least one of $R_1$, $R_2$ and $R_3$ is hydrogen.

The compounds (II) are useful as fungicides in combating infections by microorganisms such as Trichophyton asteroides and as an intermediate in the production of 3-(2-nitro-3-chlorophenyl)-4-chloropyrrole.

The 3-(substituted phenyl) pyrrole derivatives (II) may be prepared by decarboxylation, with heating, of a compound having the general Formula III:

(III)

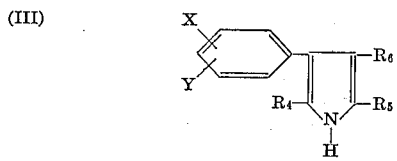

in which $R_4$ and $R_5$ are hydrogen, lower alkyl, carboxyl or esterified carboxyl; $R_6$ is hydrogen, halogen or carboxyl; provided at least one of $R_4$, $R_5$ and $R_6$ is carboxyl or esterified carboxyl; and X and Y are the same as defined in the Formula II.

In the above formula of II and III, the esterified carboxyl of $R_1$, $R_2$, $R_4$ and $R_5$ means alkyl or aralkyl ester of carboxylic acid, such as the methyl ester, ethyl ester, propyl ester, isopropyl ester, butyl ester, isobutyl ester, benzyl ester or phenethyl ester.

Examples of lower alkoxy in X and Y are methoxy, ethoxy, propoxy, isopropoxy, butoxy, or isobutoxy. Examples of halogen in X, Y, $R_3$ or $R_6$ are chlorine or bromine.

Some examples of the compound (III) as the starting material are 3-phenylpyrrole-4-carboxylic acids, such as 5-methyl-3-phenylpyrrole-4-carboxylic acid, 2,5-dimethyl-3-phenylpyrrole-4-carboxylic acid or 2-ethoxycarbonyl-5-methyl-3-phenylpyrrole-4-carboxylic acid; 3 - phenylpyrrole-2 or 5-carboxylic acids, such as 4-chloro-3-phenylpyrrole-2 or 5-carboxylic acid, 5-methyl-3-phenylpyrrole-2 - carboxylic acid, 4-chloro-5-methyl-3-phenylpyrrole-2-carboxylic acid or 2-ethoxycarbonyl-4-chloro-3-phenylpyrrole-5-carboxylic acid; 3-phenylpyrrole-2,5-dicarboxylic acids, such as 4-chloro-3-phenylpyrrole-2,5-dicarboxylic acid or 4-bromo-3-phenylpyrrole-2,5-dicarboxylic acid in which all the phenyl radicals are substituted with one or two of halogen, nitro or lower alkoxy.

These compounds (III) are all new and may be prepared, for instance, as follows:

Some of 3-(substituted phenyl) pyrrole-2,5-dicarboxylic acids are obtained by reacting 1-(substituted phenyl)-1,3-butanediones with aminomalonic esters in the presence of a condensing agent as alkyl polyphosphate, by halogenating the resultant 5-methyl-3-(substituted phenyl) pyrrole-2-carboxylic acid esters, then by solvolysing the resulting 4-halo-5-trihalomethyl-3-(substituted phenyl) pyrrole-2-carboxylic acid esters with strong alkali. In this procedure, 5-methyl-3-(substituted phenyl) pyrrole-2-carboxylic acids are easily obtained by hydrolysis of 5-methyl-3-(substituted phenyl) pyrrole-2-carboxylic acid esters and further 4-halo-5-carboxy-3-(substituted phenyl) pyrrole-2-carboxylic acid esters can also be obtained by solvolysis of 4-halo-5-trihalomethyl-3-(substituted phenyl) pyrrole-2-carboxylic acid esters with weak alkali. Furthermore, some of 3-(substituted phenyl) pyrrole-4-carboxylic acids are obtained by condensing 2-aminoalkanophenones having a substituent in phenyl radical, with β-ketoacid esters and then hydrolysing the resultant 3-(substituted phenyl) pyrrole-4-carboxylic acid esters.

The decarboxylation of this invention is carried out under heating either in the presence or absence of a base or an inorganic acid, with or without the utilization of a solvent. Among the bases may be mentioned inorganic bases such as sodium hydroxide, potassium hydroxide, sodium carbonate or potassium carbonate, or organic bases such as dimethylaminoethanol, dimethylaniline, diethylaniline, methylaniline, aniline, dimethylnaphthylamine, α-, β-, or γ-picoline, or quinoline. The organic bases in liquid may act as the solvent. Among the inorganic acids are hydrochloric acid or sulfuric acid. A few examples of the solvents are water, aliphatic lower alcohol, or high boiling solvent, such as glycerin, naphthalene or benzoic acid. Furthermore, a catalyst such as copper powder may be used with the organic base.

The reaction is generally carried out by heating at about 130°–270° C. But, the reaction in the presence of the inorganic acid may proceed at a comparatively low temperature of about 60°–130° C. In using hydrochloric acid as an inorganic acid, it is desirable to use aliphatic lower alcohol as a solvent.

Moreover, the reaction may be carried out either in atmosphere, under increased or reduced pressure. The decarboxylation conditions mentioned above may be divided roughly into (a) heating of (III) without adding any reagent;
(b) heating of (III) in a high boiling solvent;
(c) heating of (III) in the presence of an organic base;
(d) heating of (III) in the presence of an inorganic base in water; and
(e) heating of (III) in the presence of an inorganic acid.

It is desirable to select suitable one of the conditions taking for due consideration of the kind of a radical capable of splitting off carbon dioxide in pyrrole nucleus of (III) and/or the kind and position of a substituent in phenyl radical of (III). The desirous condition of various kinds of (III) becomes apparent in the description in some of the typical examples described herein.

Furthermore, in case of using 3-(substituted phenyl) pyrrole-2,5-dicarboxylic acid as a starting material, the decarboxylation occurs firstly in carboxyl at 5-position and then at 2-position, and therefore the 2-carboxylic acid compound as an intermediate may be separated out from the reaction system.

Although reference has been specifically made to a compound of the Formula III in which $R_4$ and/or $R_5$ is carboxyl, a compound of the formula in which one or both of $R_4$ and $R_5$ is a group readily changeable to carboxyl under the decarboxylation conditions as employed can also be used in a practical embodiment of this invention. For example, 2-ethoxy-carbonyl-4-chloro-5-trihalomethyl-3-phenylpyrrole which may be considered as the precursor of 2-ethoxycarbonyl-4-chloro-3-phenylpyrrole-5-carboxylic acid can be directly subjected to the decarboxylation according to the present invention, thereby to yield 4-chloro-3-phenylpyrrole.

Under a decarboxylation condition that is heating in an aqueous sodium hydroxide solution under an increased pressure, an esterified carboxyl group attached to the 2- and/or 5-position also can be taken away with splitting of carbon dioxide. Thus, under said decarboxylation condition, 2-ethoxycarbonyl-4-chloro-3-phenylpyrrole-5-carboxylic acid can be converted to 4-chloro-3-phenylpyrrole, through 4 - chloro-3-phenylpyrrole-2,5-dicarboxylic acid. Under the usual decarboxylation conditions other than that specified above, an esterified carboxyl group or groups which may be present in a compound of the general Formula III remains unchanged.

METHOD OF PREPARATION INVOLVING HALOGENATION

Certain compounds of this invention may be produced by a method involving halogenation. Such compounds have the Formula IV:

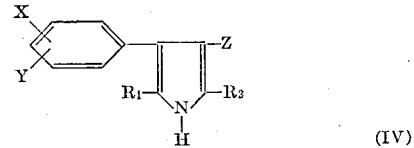

(IV)

in which X is hydrogen, halogen, nitro or lower alkoxy group; Y is halogen, nitro or lower alkoxy group; Z is halogen; and $R_1$ and $R_2$ are methyl, trihalomethyl group or COOR' in which R' is lower alkyl or lower aralkyl, provided that when one of $R_1$ and $R_2$ is trihalomethyl, the other is trihalomethyl or COOR'.

The compounds (IV) are especially useful as key intermediate in the synthesis of 3-phenylpyrrole derivatives including 3-(2-nitro-3-chlorophenyl) - 4 - chloropyrrole which has recognized utility in combatting infections of fungi, such as Trichophyton asteroides.

In the broader aspects, a compound of the general Formula IV can be prepared according to the present invention by halogenation of a compound of the general Formula V:

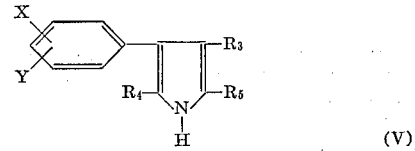

(V)

in which X and Y individually have the same significance as defined hereinbefore; $R_3$ is hydrogen, halogen or carboxyl group; and $R_4$ and $R_5$, same or different, are methyl or COOR wherein R is lower alkyl or aralkyl, provided that at least one of $R_4$ and $R_5$ should be methyl in case when $R_3$ is taken for halogen.

In a compound of the Formula V, halogenation occurs first at the $\beta$-position, if there is a replaceable hydrogen or carboxyl group, and then it occurs at the $\alpha$-methyl group. Accordingly, the halogenation processes disclosed by the present invention involves the following typical reactions:

(A) Nucleic halogenation: The term, "nucleic halogenation," used herein should be understood to mean halogenation at the $\beta$-position of the pyrrole nucleus.

(B) Side chain halogenation: The term, "side chain halogenation," used herein should be understood to cover the complete halogenation (i.e. trihalogenation) of methyl group which may be present at the $\alpha$- and/or $\alpha'$-positions of the pyrrole nucleus.

(C) Exhaustive halogenation: The term, "exhaustive halogenation," used herein should be understood to cover such a case where both the nucleic halogenation and side chain halogenation simultaneously occur, or in the technical strictness, they take place successively without appreciable accumulation of any intermediate chlorination product.

Generally speaking, the halogenation process of the present invention can be carried out by using a suitable halogenating agent which is known per se in the art. Typical halogenating agents may include halogens such as chlorine and bromine; halogen halides such as iodine chloride, iodine trichloride and iodine bromide; sulfuryl halides such as sulfuryl chloride;

And N-halo-amides or -imides such as N-chloro-urea, N-bromo-acetamide, N-bromo - succinimide, N-bromophthalimide and the like. A halogenating agent particularly preferable to the intended halogenation reaction can be easily selected by those skilled in the art. Further it should be understood that the amount of a halogenating agent used be varied depending on the type of the intended halogenation reaction. Usually, the theoretical amount or a slight excess thereof is preferable. The halogenation reaction is conveniently carried out in a solvent medium. Suitable solvents are, for example, ether, chloroform, glacial acetic acid, etc. Use of a catalyst for the reaction, i.e. iodine, acetyl chloride, cupric chloride, aluminum chloride, etc., sometimes is advantageous. The reaction can be carried out at room temperature or an elevated temperature. However, too high temperatures are not recommendable because of the occurrence of undesired side reactions.

There is now given an explanation with reference to the individual types of the halogenation reactions involved herein.

(A) Nucleic halogenation: Through this reaction, the replaceable hydrogen or carboxyl group present at the $\beta$-position of the pyrrole ring of a phenyl-pyrrole compound can be substituted with halogen. The compounds of the general Formula V wherein $R_3$ is hydrogen or carboxyl group and/or at least one of $R_4$ and $R_5$ is esterified carboxyl group are suitable materials for this reaction. The hydrogen or carboxyl group existing at the $\beta$-position is more easily replaceable by halogen than methyl group existing at the $\alpha$- and $\alpha'$-positions. Esterified carboxyl group (e.g. alkoxycarbonyl such as methoxycarbonyl or ethoxycarbonyl, benzyloxycarbonyl, phenethyloxycarbonyl, etc.) which may be present at any of the $\alpha$- and $\alpha'$- positions is free from the action of a halogenating agent. Sulfuryl chloride, chlorine, bromine or N-bromosuccinimide is the preferred halogenating agent for the nucleic halogenation because of the availability and convenience in handling.

(B) Side chain halogenation: Methyl group which may be present at the $\alpha$- and/or $\alpha'$-position of the pyrrole ring in the compound of the general Formula V is subject to halogenation with a halogenating agent to convert into trihalomethyl group. Substitution of a replaceable hydrogen or carboxyl group at the $\beta$-position with halogen (i.e. nucleic halogenation) is more ready for the action of a halogenating agent than the complete halogenation of $\alpha$- and/or $\alpha'$-methyl group (i.e. side chain halogenation). Accordingly, if a compound of the general Formula V wherein $R_3$ is hydrogen or carboxyl group, and at least one of $R_4$ and $R_5$ is methyl group is treated with approximately one mole of a halogenating agent per mole of said compound, the resulting halogenation product will be a compound of the general Formula IV wherein Z is halogen and at least one of $R_1$ and $R_2$ is methyl corresponding to the designation of $R_4$ and $R_5$.

With respect to side chain halogenation in a narrow sense, typical starting materials are compounds of the general Formula V wherein $R_3$ is chlorine or bromine and at least one of $R_4$ and $R_5$ is methyl.

However, side chain bromination of a compound of the general Formula V wherein $R_3$ is bromine and at least one of $R_4$ and $R_5$ is methyl is considerably difficult. Furthermore, side chain chlorination of said compound occasionally yields a compound of the general Formula IV wherein Z is chlorine and at least one of $R_1$ and $R_2$ is trichloromethyl group, possibly through a compound of the general Formula IV wherein $R_3$ is chlorine and at least $R_4$ and $R_5$ is methyl group. Thus, careful consideration concerning the type and amount of a halogenating agent and other conditions should be paid if the bromination or chlorination of 4-bromo-3-phenylpyrrole compounds is desired.

(C) Exhaustive halogenation: A compound of the general Formula V where $R_3$ is hydrogen or carboxyl group and at least one of $R_4$ and $R_5$ is methyl group is treated with more than one mole of a halogenating agent to effect both nucleic halogenation and side chain halogenation. The excess amount of a halogenating agent than that required for nucleic halogenation will substitute the replaceable hydrogens of the $\alpha$- and/or $\alpha'$-methyl groups. Accordingly, a methyl group attached to the $\alpha'$-position of pyrrole nucleus is converted to tri-halomethyl group.

Suitable starting materials include 3-(substituted phenyl) pyrrole-2,5-dicarboxylic acid esters such as dimethyl 3-(3-nitro-4-chlorophenyl) pyrrole-2,5-dicarboxylate, dimethyl 3-(3-nitrophenyl) pyrrole-2,5-dicarboxylate, etc.; 3-(substituted phenyl)-5-methylpyrrole-2-carboxylic acid esters such as ethyl 3-(2-nitro-3-chlorophenyl)-5-methylpyrrole-2-carboxylate, ethyl 3-(2-nitro-3-chlorophenyl)-4-carboxy-5-methylpyrrole-2-carboxylate, etc.; ethyl 3-(substituted phenyl) - 4-chloro-5-methylpyrrole-2-carboxylate, 2,5-dimethyl-3-(substituted phenyl)-4-chloropyrrole, 2,5-dimethyl-3-(substituted phenyl) pyrrole and 2,5-dimethyl-3-(substituted phenyl) pyrrole-4-carboxylic acid. All of these materials are new compounds and they may be prepared from alkyl 3-(substituted phenyl)-5-methylpyrrole-4-carboxylate (cf. the copending U.S. application Ser. No. 468,970, now U.S. Patent No. 3,328,421) by the following procedures:

(1) Some of 3 - (substituted phenyl) - 4 - carboxy-5-methylpyrrole-2-carboxylic acid esters are obtained by subjecting 3 - (substituted phenyl)-5-methylpyrrole-4-carboxylic acid ester to Vilsmeier reaction, reacting the resulted 2-formyl-3-(substituted phenyl)-5-methylpyrrole-4-carboxylic acid ester with hydroxylamine or its salt, heating the resulted 2-hydroxyiminomethylene-3-(substituted phenyl)-5-methylpyrrole-4-carboxylic acid ester, reacting the resulted 2 - cyano-3-(substituted phenyl)-5-methylpyrrole-4-carboxylic acid ester with an alcohol in the presence of mineral acid, and then hydrolyzing the obtained 3-(substituted phenyl)-5-methylpyrrole-2,4-dicarboxylic acid ester.

(2) 3 - (substituted phenyl) - 5 - methylpyrrole-2-carboxylic acid esters are obtained by hydrolyzing 3-(substituted phenyl)-5-methylpyrrole-4-carboxylic acid ester, decarboxylating the resulted 3-(substituted phenyl)-5-methylpyrrole-4-carboxylic acid, reacting the resulted 3-(substituted phenyl)-5-methylpyrrole with carbonyl dihalide and then reacting the obtained 3-(substituted phenyl)-5-methylpyrrole-2-carboxylic acid halide with an alcohol. Alternatively they can be obtained by decarboxylation of 3-(substituted phenyl)-4-carboxy-5-methylpyrrole-2-carboxylic acid esters in the preceding paragraph (1). 3-(substituted phenyl)-5-methylpyrrole-2-carboxylic acid esters may be converted by this reaction to 3-(substituted phenyl)-4-halo-5-methylpyrrole-2 - carboxylic acid esters which also may be used as starting materials of the present invention.

(3) Some of 2,5-dimethyl-3-(substituted phenyl)pyrrole-4-carboxylic acid are obtained by subjecting 3-(substituted phenyl)-5-methylpyrrole-4-carboxylic acid ester to Mannich reaction, reacting the resulted 2-dialkylaminomethyl-3-(substituted phenyl)-5-methylpyrrole - 4 - carboxylic acid esters with alkyl halide, reducing the resulted [4 - alkoxy-carbonyl-5-methyl-3-(substituted phenyl)-2-pyrrolyl]-methyltrialkylammonium halide, and then hydrolyzing the obtained 2,5-dimethl-3-(substituted phenyl)-pyrrole-4-carboxylic acid esters, and they can be converted by the decarboxylation reaction to 2,5-dimethyl-3-(substituted phenyl) pyrrole which also can be used as starting materials of this invention.

METHOD OF PREPARATION INVOLVING SOLVOLYSIS

Some of the compounds of the phenyl pyrroles of this invention may be produced by a method involving solvolysis. Such compounds have the following Formula VI:

(VI) 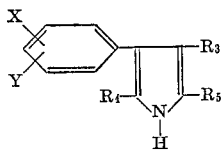

in which X is hydrogen, halogen, nitro or lower alkoxy group; Y is halogen, nitro or lower alkoxy group; $R_3$ is hydrogen or halogen; $R_4$ and $R_5$ individually mean hydrogen, lower alkyl or carboxyl group, provided that at least one of $R_4$ and $R_5$ is a carboxyl group.

The compounds (VI) are useful as key intermediates in the synthesis of 3-phenylpyrrole derivatives including 3-(2-nitro-3-chlorophenyl)-4-chloropyrrole which has recognized utility in combatting infections of fungi, such as *Trichophyton asteroides*.

In the broader aspects, a compound of the general Formula VI may be prepared by solvolyzing an appropriate compound of the general Formula VII:

(VII) 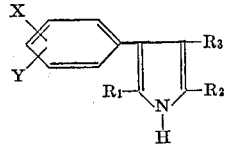

in which $R_3$, X and Y individually have the same significance as defined in Formula VI; and one of $R_1$ and $R_2$ is trihalomethyl or esterified carboxyl group and the other is hydrogen, lower alkyl, trihalomethyl, carboxyl or esterified carboxyl group, provided that in case the one of $R_1$ and $R_2$ is taken for trihalomethyl, the other should be trihalomethyl or esterified carboxyl group.

Trihalomethyl group or groups attached to either one or both of the α- and α'-positions in the pyrrole ring of a compound of the general Formula VII can be converted to a carboxyl group by treatment with water, an aliphatic carboxylic acid or an aliphatic alcohol. Sometimes, the halomethyl group may be converted to an esterified carboxyl group by treatment with an aliphatic alcohol in the presence or absence of an organic base, the resulting esterified carboxyl group in turn being converted to carboxyl group in the manner specified below.

An esterified carboxyl group or groups attached to either one or both of the α- and α'-positions of the pyrrole ring of a compound of the general Formula VII can be converted to free carboxyl group by treatment in an aqueous medium with a strong alkali.

The preferred embodiments of solvolysis according to the present invention are specified hereinbelow:

In the rather generic embodiment of the present invention, a compound of the general Formula VII is reacted with water in the presence or absence of a weak alkali, thereby to convert trihalomethyl group to carboxyl group while an esterified carboxyl group is kept unchanged, or in the presence of a strong alkali, thereby to convert both of the trihalomethyl group and esterified carboxyl group to carboxyl groups. The reaction may be carried out in an aqueous medium, e.g. water or aqueous solution containing an aliphatic alcohol or a lower aliphatic carboxylic acid. Use of water as a solvent, which serves as a reactant at the same time, is preferable. The conversion of trihalomethyl group to carboxyl can be made by simply boiling a starting material with water, but it is preferable to effect the reaction in the presence of an alkali. Suitable alkalis are strong alkali such as sodium hydroxide, barium hydroxide, etc., and weak alkali such as sodium carbonate, sodium bicarbonate, etc. However, if trihalomethyl group of a compound of the general Formula VII which also contains hydrolyzable esterified carboxyl group should be solvolyzed selectively, it is essential to carry out the reaction in the presence of a weak acid or alkali, since the existence of a strong alkali will cause simultaneous hydrolysis of the esterified carboxyl group. In other words, it is necessary to carry out the reaction in the presence of a strong alkali, if both of trihalomethyl group and esterified carboxyl group of a compound of the general Formula VII should be converted at once to carboxyl group.

In a specific embodiment where tert.-butoxy-carbonyl group is present at the α- or α'-position of the pyrrole ring of a compound of the general Formula VII, heating of this compound with a mineral acid or toluene-sulfonic acid will suffice to convert said tert.-butoxy-carbonyl group to carboxyl group, with splitting off butene.

In accordance with the present invention, the mixture of a trihalomethyl compound and a dihalomethyl compound may be subjected to the specific solvolysis so as to convert their trihalomethyl and dihalomethyl groups to carboxyl groups. This is based on the finding that a compound of the general Formula VII in which $R_1$ and/or $R_2$ are dihalomethyl group is subjected to oxidative solvolysis by treatment with an aqueous solution of a strong alkali in combination with an oxidizing agent, thereby to convert the dihalomethyl group to carboxyl group. An esterified carboxyl group if present in the starting compound also may convert to carboxyl group. Suitable strong alkalis include sodium hydroxide and potassium hydroxide. Suitable as oxidizing agent are silver oxide or alkali metal permanganates. Use of a strong alkali is essential for the intended purpose, because the combination of a weak acid or alkali with an oxidizing agent will yield the solvolysis product wherein the dihalomethyl group is converted to formyl group while the esterfied carboxyl group remains unchanged. The instant reaction is usually carried out in a solvent such as water or alcohols. A reaction temperature varies, without particular limitation, depending on the type of an oxidizing agent. In carrying out the synthesis of a certain compound (e.g. 3-(3-nitro-4-chlorophenyl)-4-chloropyrrole), the oxidative solvolysis as illustrated above may have a considerable significance, because the said solvolysis makes it possible to deal with a mixture of a trihalomethyl compound and a dihalomethyl compound, which mixture may result from the halogenation process of the corresponding methyl compound, without the isolation of individual components of the said mixture.

In general, there is no particular limitation to the reaction temperature to be employed in the above-described solvolysis but an elevated temperature is preferable to shorten the required reaction period. The solvolysis product which has a salt-forming free carboxyl group may be recovered in the form of a metal salt.

In another generic embodiment of the present invention, a compound of the general formula VII where at least one of $R_1$ and $R_2$ is trihalomethyl group is reacted with a lower aliphatic carboxylic acid under substantially anhydrous condition, thereby to convert the halomethyl group to carboxyl group. Suitable lower aliphatic acids includes those in which the alkyl portion contains up to three carbon atoms, e.g., acetic acid, propionic acid, etc. Sometimes heating is preferable to shorten the period required to complete the reaction.

In still another generic embodiment, a compound of the general Formula VII is reacted with an aliphatic alcohol (R'OH wherein R' is lower alkyl or aralkyl) in the presence or absence of an organic base, thereby to convert trihalomethyl group to the correspondingly esterified carboxyl group (—COOR'). Suitable alcohols include methanol, ethanol, propanol, n-butanol, tert.-butanol, cyclohexanol, benzyl alcohol, etc. These alcohols are used with or without a solvent such as benzene, ether or the like. If no particular solvent is used, the alcohol used also serves as a solvent. It is preferable to carry out the reaction in the presence of an organic base such as triethyl amine, pyridine, etc. There is no particular limitation to reaction temperatures. However, it is usually recommendable to carry out the reaction at a temperature approximating to the boiling point of a solvent used.

Typical compounds of the general Formula VII which are suitable as the starting materials of the present invention are the following: Mono- and diesters of 3-(substituted phenyl) pyrrole-2,5-dicarboxylic acids and 3-(substituted phenyl)-4-halo-pyrrole-2,5-di-carboxylic acids, wherein the ester portion is alkyl such as methyl, ethyl, propyl, butyl, etc., or aralkyl such as benzyl, phenethyl, etc., and 2-(or 5-)trihalomethyl-3-(substituted phenyl)-4-halo-pyrrole-5-(or 2-) carboxylic acid esters and 2,5-di-trihalomethyl-3-(substituted phenyl) - 4 - halo - pyrroles. These compounds are new compounds some of which can be obtained according to the methods described in our copending application Ser. No. 489,432, filed Sept. 22, 1965.

The compounds produced according to the present invention can be converted to pyrrolnitrin or its derivatives through the decarboxylation reaction.

METHOD OF PREPARATION INVOLVING RING-CLOSURE

Certain 3-phenylpyrrole-2-carboxylic acid compounds of this invention are produced by a method involving the Ring-closure. Such compounds have the Formula VIII:

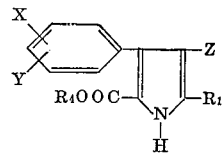
(VIII)

in which X is hydrogen, halogen, nitro or lower alkoxy; Y is halogen, nitro or lower alkoxy; Z is hydrogen or halogen; $R_1$ is lower alkyl; and $R_4$ is hydrogen, lower alkyl or lower aralkyl.

The compounds (VIII) are useful as unstriped muscle relaxants and are also useful as key intermediates in the preparation of 3-phenylpyrrole derivatives, including 3-(2-nitro-3-chlorophenyl)-4-chloropyrrole, which has recognized utility in combatting infection of fungi, such as *Trichophyton asteroides* and possesses high antimicrobial activities against fungi, particularly trichophyton and weak activities against gram-positive bacteria.

The 3-phenylpyrrole-2-carboxylic acid compounds (VIII) may be prepared by reacting 1-phenylalkanone derivative having the Formula IX:

$$\text{X-C}_6\text{H}_3\text{(Y)}-\text{CO}-\overset{Z}{\underset{|}{\text{CH}}}-\text{CO}-\text{R}_1 \quad \text{(IX)}$$

or its alkali metal salt, with glycine derivative having the Formula X:

$$\text{H}_2\text{N}\overset{R_2}{\underset{|}{\text{CH}}}-\text{COOR}_3 \quad \text{(X)}$$

or its salt to make N-(3-phenyl-3-oxopropylidene) glycine derivative having the Formula XI:

(XI)

then by ring-closing the resultant (XI) in the presence of a condensing agent, and if needed, by hydrolysing the reaction product.

In the above Formula X represents hydrogen, halogen, nitro or lower alkoxy; Y represents halogen, nitro or lower alkoxy; Z represents hydrogen or halogen; $R_1$ represents lower alkyl; $R_2$ represents hydrogen or esterified carboxyl; —COOR_3 represents esterified carboxyl wherein $R_3$ is lower alkyl or aralkyl. As used herein, the term "lower" is intended to mean groups containing from one to six carbon atoms.

The mechanism of the reaction can be represented as follows:

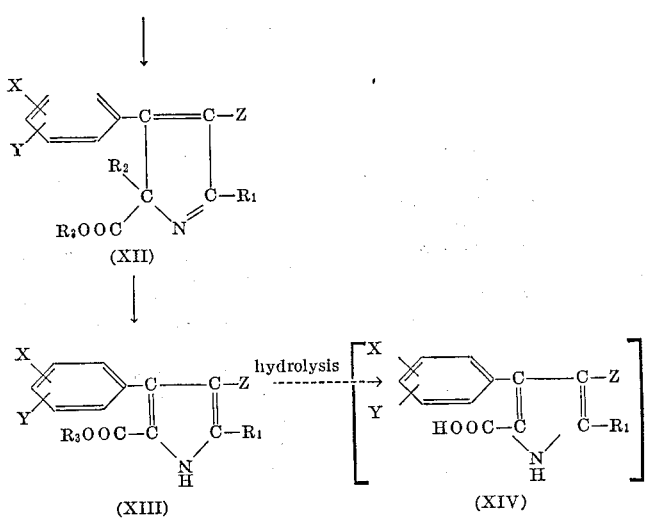

In the above formula, (IX)', (IX)" and (XI)' are represented for the tautomers of (IX) and (XI), respectively.

1-phenylalkanone derivatives as a starting material are partly known substances, e.g. 1-(2-nitro-4-chlorophenyl)-1,3-butanedione (Journal of Organic Chemistry 11, 414) and may be prepared by using the method of the said Journal and/or the method known in the arts.

1-phenylalkanone derivatives (IX) in this invention mean 1-phenyl-1,3-butanedione, 1-phenyl-2-halo-1,3-butanedione, 1-phenyl-1,3-pentanedione, 1-phenyl-2-halo-1,3-pentanedione, 1-phenyl-1,3-hexanedione, 1-phenyl-2-halo-1,3-hexanedione, etc., in each of which phenyl may be substituted with one or two of nitro halogen such as chlorine or bromine, and lower alkoxy such as methoxy, ethoxy, propoxy or butoxy.

Also, glycine derivatives (X) include glycine esters such as the methyl ester, ethyl ester, propyl ester, butyl ester, tert.-butyl ester, benzyl ester or phenethyl ester, or aminomalonic acid diester such as the dimethyl ester, diethyl ester, dipropylester, dibutylester, ditert.-butyl ester, dibenzylester, diphenethyl ester. Salts of (X) may be used such as (X) combined with an inorganic acid as hydrochloric acid, sulfuric acid, etc., or with organic acid.

The reaction of 1-phenylalkanone derivative (IX) or its alkali metal salt, with glycine derivative (X) or its salt is generally carried out in a solvent, and may be carried out with the addition of a base. Among the solvents are water, benzene, xylene, aliphatic lower alcohol, dichloromethane, chloroform, tetrachloromethane, 1,2-dichloroethane glacial acetic acid, acetic acid, etc. A few examples of the bases are alkali metal hydroxide such as sodium hydroxide or potassium hydroxide, alkalimetal hydrogen carbonate such as sodium hydrogen carbonate or potassium hydrogen carbonate, alkali metal carbonate such as sodium carbonate or potassium carbonate and organic base such as sodium acetate, piperidine, pyridine or trialkylamine. In using the salt of glycine derivative (X) as a starting material, it is preferable to carry out the reaction in the presence of the base. The reaction temperature is not particularly limited, being preferably at room temperature or at the boiling point of a solvent to be used.

By this reaction, N-(3-phenyl-3-oxopropylidene) glycine derivatives (XI) produced can generally be separated out in crystals, but in some cases, 3-phenylpyrrole-2-carboxylic acid derivatives (XIII) may be produced through (XII), as the result of the ring-closure of (XI) which will take place subsequent to the said reaction. For instance, (XIII) can be obtained by reacting (IX) with (X) in the presence of the condensing agent such as sodium hydroxide or ethyl polyphosphate under anhydrous condition.

The ring-closure of (XI) is generally carried out in the presence of a condensing agent and in an absolute solvent. Among the condensing agents are alkali metal (as potassium or sodium), alkali metal alcoholate, alkali metal hydride, alkali metal amide, triphenylmethyl alkali metalate, boron tri-fluoride, zinc chloride, aluminum chloride, aluminum bromide, ferric chloride, stannic chloride, bismuth trichloride, titanium chloride, hydrogen chloride, hydrogen fluoride, a mixture of acetic anhydride and alkali metal carbonate or alkali metal acetate, pyrophosphoric acid, ethyl pyrophosphate, polyphosphoric acid, methyl polyphosphate, ethyl polyphosphate, propyl polyphosphate, isopropyl polyphosphate, piperidine, pyridine and triethylamine. The condensing agent in liquid may be used as a solvent. A few examples of the solvents are ethanol, ether, chloroform, benzene, toluene, xylene, dioxane, tetrahydrofuran, dimethylsulfoxide or dimethyl formamide. The reaction is mainly carried out under cooling or heating to the boiling point of a solvent to be used.

The resulting 3-phenylpyrrole-2-carboxylic acid derivatives (XIII), by hydrolysis, may be converted to the corresponding free acid, if needed. A preferable hydrolyzing agent is an alkali metal hydroxide such as sodium hydroxide or potassium hydroxide, or inorganic acid such as sulfuric acid.

The 3-phenylpyrrole-2-carboxylic acid derivative (VIII) may also be prepared by the following procedure using 3-phenyl-5-alkylpyrrole derivatives which are the decarboxylated compound of 3-phenyl-5-alkylpyrrole-4-carboxylic acid derivatives prepared as described in the copending U.S. patent application Ser. No. 468,970. That is, the procedure is that the 3-phenyl-5-alkylpyrrole derivative is reacted with carbonyl dihalide as phosgene to obtain 3-phenyl-5-alkylpyrrole-2-carboxylic acid halide derivative and then solvolyzed with water or alcohol.

The method of preparing compounds of this invention, which method involves the ring-closure heretofore described, is also disclosed in the copending application of Umio et al. Ser. No. 489,412, filed Sept. 22, 1965.

The antimicrobial activity of certain compounds of this invention is given in the following table showing results in the testing of those compounds against various kinds of disease microorganisms.

There is shown in the table the Minimum Inhibitory Concentration (M.I.C.) as measured for each compound according to the conventional agar dilution method. The results for pyrrolnitrin [3-(2-nitro-3-chlorophenyl)-4-chloropyrrole] is also shown as a basis of comparison.

| Compound | Minimum Inhibitory Concentration For Specified Microorganism ||||||
|---|---|---|---|---|---|
| | Tricho., 2 days | St. aur. | E. coli | Can. alb. | Myco., 3 days |
| Pyrrolnitrin [3-(2-nitro-3-chlorophenyl)-4-chloropyrrole] | 1 | 40 | >40 | 25 | 10 |
| 3-(3-nitro-4-chlorophenyl)-4-chloropyrrole | 2 | >20 | >20 | >20 | 10 |
| 3-(2-nitro-4-chlorophenyl)-4-chloropyrrole | 5 | >40 | >40 | >40 | 20 |
| 3-(4-nitrophenyl)-4-chloropyrrole | 5 | >40 | >40 | >40 | >40 |
| 3-(2-nitrophenyl)-4-chloropyrrole | 5 | >40 | >40 | >40 | 20 |
| 3-(3-nitrophenyl)-4-chloropyrrole | 10 | >40 | >40 | >40 | >40 |
| 3-(2-chlorophenyl)-4-chloropyrrole | 1 | 10 | 20 | 1 | 10 |
| 3-(3-chlorophenyl)-4-chloropyrrole | 5 | 10 | 20 | 1 | 10 |
| 3-(3-bromophenyl)-4-chloropyrrole | <0.25 | 10 | 10 | 10 | 5 |
| 3-(2-nitro-3-chlorophenyl)-5-methylpyrrole | 2 | 40 | >40 | 40 | 10 |
| 3-(2-nitro-3-chlorophenyl)-4-chloro-5-methylpyrrole | 1 | >40 | >40 | >40 | >40 |
| 3-(2-nitro-3-chlorophenyl)-5-ethylpyrrole | 5 | >40 | >40 | >40 | 10 |
| 3-(2-nitro-3-chlorophenyl)-2,5-dimethylpyrrole | 2.5 | >40 | >40 | >20 | 20 |
| 3-(2-nitro-3-chlorophenyl)-4-chloro-5-methylpyrrole-2-carboxylic acid | 20 | >40 | >40 | >40 | >40 |
| 3-(3-nitro-4-chlorophenyl)-5-methylpyrrole | 20 | >40 | >40 | >40 | >40 |
| 3-(2-nitro-3-chlorophenyl)-pyrrole | 4 | >40 | >40 | 20 | 40 |

NOTE.—Tricho.= *Trichophyton asteroides*; St. aur.= *Staphylococcus aureus* 209P; E. coli= *Escherichia coli*; Can. alb.= *Candida albicans*; Myco.= *Mycobacterium tuberculosis* SP 607.

DESCRIPTION OF THE PREFERRED EMBODIMENTS

A more comprehensive understanding of this invention is obtained by reference to the following examples.

Example 1

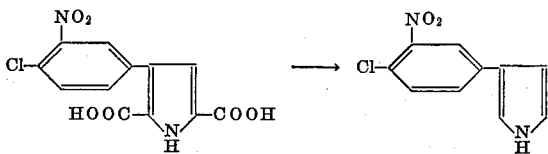

A mixture of 30 mg. of 3-(3-nitro-4-chlorophenyl) pyrrole-2,5-dicarboxylic acid and 1 cc. of concentrated sulfuric acid was heated at 120° C. in an oil bath for 6 minutes. This solution was diluted with water and extracted with benzene. The benzene extract was washed with an aqueous solution of sodium hydrogen carbonate and dried. Benzene was distilled off to produce yellow crystals. These crude crystals were recrystallized from a mixture of benzene and petroleum benzine to obtain 3-(3-nitro-4-chlorophenyl) pyrrole as yellow crystals, M.P. 91–92° C.

Example 2

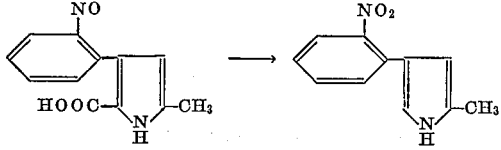

3-(2-nitrophenyl)-5-methylpyrrole - 2 - carboxylic acid (600 mg.) was dissolved in 6 cc. of dimethylaniline. The solution was heated for an hour under reflux with stirring, then cooled and poured into 60 cc. of 10% hydrochloric acid. The solution was extracted with benzene and the benzene extract was washed with water and then with 5% sodium hydroxide aqueous solution, and dried. The solution was passed through a Buchner's funnel with silica-gel for chromatographic use, and the filtrate was condensed under reduced pressure to obtain 50 mg. of 3-(2-nitrophenyl)-5-methylpyrrole as liquid.

Infrared absorption spectrum:
$\nu NO_2$: 1363 cm.$^{-1}$, 1525 cm.$^{-1}$.
$\nu NH$: 3410 cm.$^{-1}$.

Example 3

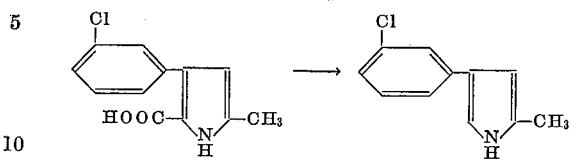

3-(3-chlorophenyl)-5-methylpyrrole-2 - carboxylic acid (200 mg.) was dissolved in 2 cc. of dimethylaniline. The solution was heated for an hour under reflux with stirring, then cooled and poured into 20 cc. of 10% hydrochloric acid. The solution was treated as described in Example 2.

The residue was recrystallized from a benzene-ligroin mixture to obtain 150 mg. of 3-(3-chlorophenyl)-5-methylpyrrole as colourless crystals, M.P. 60–61° C.

*Analysis.*—Calculated for $C_{11}H_{10}NCl$: C, 68.93; H, 5.26; Cl, 18.50. Found: C, 68.83; H, 5.39; Cl, 18.20.

Example 4

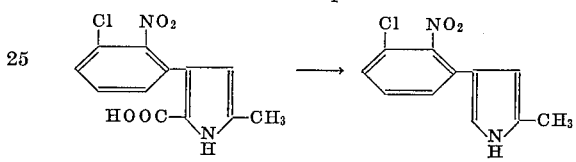

(i) 3-(2-nitro-3-chlorophenyl)-5-methylpyrrole-2 - carboxylic acid (500 mg.) was dissolved in 10 cc. of dimethylaniline. The solution was heated under reflux for 1 hour with stirring, allowed to cool, poured into 30 cc. of 10% hydrochloric acid and the solution was extracted with benzene. The extract was dried and condensed under reduced pressure and the residue was recrystallized from a benzene-ligroin mixture to obtain 300 mg. of 3-(2-nitro-3-chlorophenyl)-5-methylpyrrole as yellow prisms, M.P. 82–84° C.

*Analysis.*—Calculated for $C_{11}H_9O_2N_2Cl$: C, 55.83; H, 3.83; N, 11.84. Found: C, 55.89; H, 4.16; N, 12.01.

The minimum inhibitory concentration (MIC): *Staphylococcus aureus*, 40 $\gamma$/cc., *Candida albicans*, 40 $\gamma$/cc., *Mycobacterium* 602, 20 $\gamma$/cc., *Trichophyton interdigitale*, 5 $\gamma$/cc.

(ii) 3-(2-nitro-3-chlorophenyl) - 5 - methylpyrrole - 2-carboxylic acid (50 mg.) was heated with 10 cc. of ethanol solution containing 3 percent of hydrogen chloride under reflux for 1 hour. The solution was allowed to cool and condensed under reduced pressure. The residue was dissolved in benzene. The solution was washed with water and an aqueous solution of sodium hydrogen carbonate in turn, dried and condensed to obtain 20 mg. of 3-(2-nitro-3-chlorophenyl)-5-methylpyrrole.

Example 5

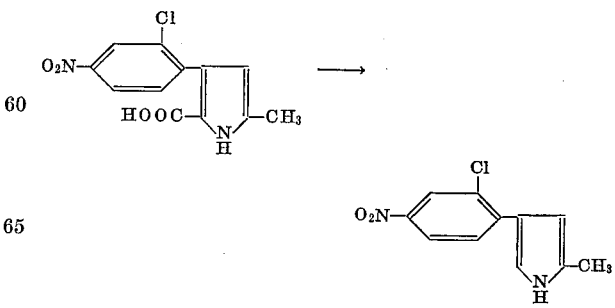

3-(2-chloro-4-nitrophenyl)-5-methylpyrrole-2 - carboxylic acid (500 mg.) was dissolved in 5 cc. of dimethylaniline. The solution was heated under reflux for an hour with stirring, cooled and poured intot 50 cc. of 10% hydrochloric acid. The solution was treated as described in Example 2.

The residue was recrystallized from a benzene-ligroin mixture to obtain 3-(2-chloro-4-nitrophenyl) - 5 - methylpyrrole as reddish orange needles, M.P. 165–167° C.

Analysis.—Calculated for $C_{11}H_9O_2N_2Cl$: C, 55.83; H, 3.83; N, 11.84; Cl, 14.98. Found: C, 55.80; H, 3.99; N, 11.86; Cl, 14.90.

Example 6

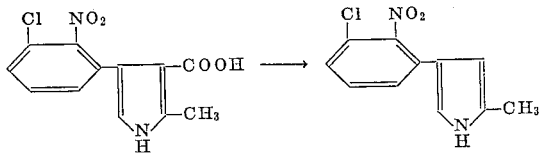

(i) A mixture of 10.0 g. of 3-(2-nitro-3-chlorophenyl)-5-methylpyrrole-4-carboxylic acid and 10 cc. of glycerine was slowly heated up to 200° C. After evolution of carbon dioxide ceased, the reactant was poured into an ice-water and then extracted with benzene. The obtained benzene layer was dried over anhydrous magnesium sulfate and chromatographed on silica-gel. The yellow benzene layer was collected and condensed at 20–30° C. under reduced pressure. The residue was recrystallized from a benzene-ligroin mixture to obtain 5.0 g. of 3-(2-nitro-3-chlorophenyl)-5-methylpyrrole as yellow crystals, M.P. 82–84° C.

Analysis.—Calculated for $C_{11}H_9O_2N_2Cl$: C, 55.83; H, 3.83; N, 11.84. Found: C, 55.84; H, 4.05; N, 11.84.

(ii) A mixture of 1.5 g. of 3-(2-nitro-3-chlorophenyl)-5-methylpyrrole-4-carboxylic acid and 1.5 g. of naphthalene was fused in an oil bath. After the reaction was completed, the reactant was dissolved in benzene.

The solution was chromatographed on silica-gel. The orange coloured third fraction was collected and condensed under reduced pressure. The residue was recrystallized from benzene to obtain 0.6 g. of the object material, 3-(2-nitro-3-chlorophenyl)-5-methylpyrrole. This material assumed a violet colour with Ehrlich's reagent.

(iii) 3 - (2 - nitro-3-chlorophenyl)-5-methylpyrrole-4-carboxylic acid (500 mg.) was suspended in 20 cc. of dimethylaniline. This suspension was heated under reflux for 30 minutes and then poured into a large volume of 10% hydrochloric acid. The solution was extracted with benzene and the resultant benzene layer was washed with an aqueous solution of potassium hydrogen carbonate and then with water, and dried. This solution was filtered through a Buchner's funnel with silica-gel and the filtrate was condensed under reduced pressure to obtain 320 mg. of 3-(2-nitro-3-chlorophenyl)-5-methylpyrrole. This material was recrystallized from benzene to obtain 3-(2-nitro-3-chlorophenyl)-5-methylpyrrole as yellow granules, M.P. 82–84° C.

(iv) 3 - (2 - nitro-3-chlorophenyl)-5-methylpyrrole-4-carboxylic acid (200 mg.) was dissolved in 10 cc. of ethanol solution containing 0.4 cc. of hydrochloric acid. The mixture was heated under reflux for 2 hours and poured into an ice-water.

The mixed solution was extracted with benzene and the benzene extract was treated as described in Example 6 (iii) to obtain 70 mg. of 3-(2-nitro-3-chlorophenyl)-5-methylpyrrole.

Example 7

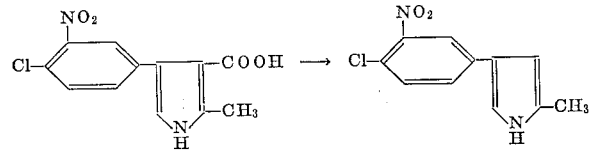

(i) 3 - (3-nitro-4-chlorophenyl)-5-methylpyrrole-4-carboxylic acid (3.0 g.) was mixed with 20.0 g. of naphthalene, and the mixture was treated as described in Example 6 (ii) to obtain 1.5 g. of 3-(3-nitro-4-chlorophenyl)-5-methylpyrrole as yellow fine needles, M.P. 76° C.

Analysis.—Calculated for $C_{11}H_9O_2N_2Cl$: C, 55.83; H, 3.83; N, 11.84; Cl, 14.98. Found: C, 56.10; H, 3.81; N, 11.74; Cl, 14.98.

(ii) 3 - (3 - nitro-4-chlorophenyl)5-methylpyrrole-4-carboxylic acid (400 mg.) was mixed with about same amount of soda asbestos. The mixture was heated for 10 minutes at 150° C. under reduced pressure (5 mm. Hg) in a combustion tube and then at 180° C. for 20 minutes. After cooling, the mixture was extracted with benzene and the extract was chromatographed on silica-gel. This first eluted fraction was condensed under reduced pressure. The residue was recrystallized from benzene to obtain 100 mg. of 3-(3-nitro-4-chlorophenyl)-5-methylpyrrole as yellow fine needles, M.P. 76° C.

(iii) A mixture of 300 mg. of 3-(3-nitro-4-chlorophenyl)-5-methylpyrrole-4-carboxylic acid and 1.5 g. of benzoic acid was heated and fused in an oil bath. The reactant was dissolved in benzene and dried after washing with 10% sodium hydroxide solution. The solvent was distilled off under reduced pressure to obtain 90 mg. of 3 - (3 - nitro-4-chlorophenyl)-5-methylpyrrole, as yellow fine needles, M.P. 76° C.

Example 8

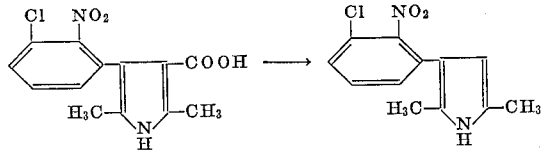

2,5 - dimethyl - 3 - (2-nitro-3-chlorophenyl) pyrrole-4-carboxylic acid (1.0 g.), and glycerine (1.0 cc.) were treated in Example 6(i) to obtain 0.3 g. of 3-(2-nitro-3-chlorophenyl)-2,5-dimethylpyrrole. (M.P. 136–137° C.)

Analysis.—Calculated for $C_{12}H_{11}O_2N_2Cl$: C, 57.51; H, 4.42. Found: C, 57.79; H, 4.92.

MIC: *Trichophyton interdigitale* 10 γ/cc.

Example 9

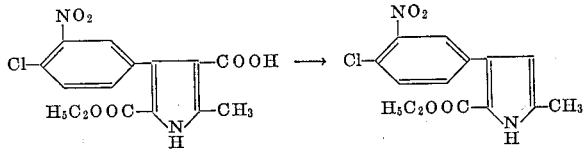

(i) A mixture of 2.4 g. of 2-ethoxycarbonyl-3-(3-nitro-4-chlorophenyl)-5-methylpyrrole-4-carboxylic acid and 20 cc. of glycerine was slowly heated, kept at 150° C. for 5 minutes and then at 180° C. for 3 minutes, and the temperature was raised to 250° C. The reaction mixture was poured into an ice-water and the solution was extracted with benzene. The extract was dried and chromatographed on silica-gel. The separated second fraction was condensed and the residue was recrystallized from benzene to obtain 0.25 g. of ethyl 3-(3-nitro-4-chlorophenyl)-5-methylpyrrole-2-carboxylate as faint yellow needles, M.P. 167° C.

Analysis.—Calculated for $C_{14}H_{13}O_4N_2Cl$: C, 54.47; H, 4.24; N, 9.08. Found: C, 54.72; H, 4.29; N, 9.07.

(ii) A mixture of 200 mg. of 2-ethoxycarbonyl-3-(3-nitro-4-chlorophenyl)-5-methylpyrrole-4 - carboxylic acid and 1.0 g. of benzoic acid was fused and refluxed for an hour. The residue was dissolved in benzene after cooling and the solution was washed with 10% sodium hydroxide and chromatographed on silica-gel with benzene. The second fraction was collected and the condensed residue was recrystallized from benzene to obtain 20 mg. of ethyl 3-(3-nitro-4-chlorophenyl)-5-methylpyrrole-2 - carboxylate. (M.P. 167° C.)

Example 10

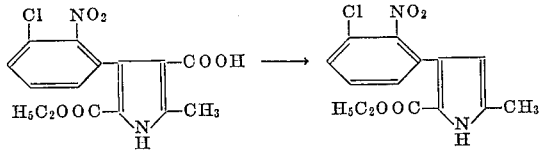

A mixture of 2 - ethoxycarbonyl - 3 - (2-nitro-3-chlorophenyl)-5-methylpyrrole-4-carboxylic acid (300 mg.) and 3 cc. of glycerine was heated and treated as described in Example 9(i) to obtain 10 mg. of ethyl 3-(2-nitro - 3-chlorophenyl)-5-methylpyrrole-2 - carboxylate. This material was recrystallized from benzene to obtain 7 mg. of faint yellow needles, M.P. 223° C.

Analysis.—Calculated for $C_{14}H_{13}O_4N_2Cl$: C, 54.47; H, 4.24; N, 9.08. Found: C, 54.46; H, 4.19; N, 8.78.

Example 11

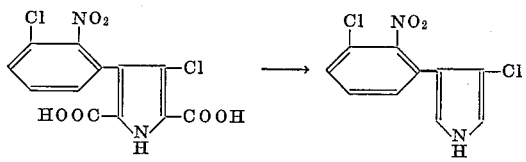

(i) 3 - (2 - nitro-3-chlorophenyl)-4-chloropyrrole-2,5-dicarboxylic acid (500 mg.) was suspended in 20 cc. of dimethylaniline and this suspension was heated under reflux for 1.5 hours with vigorous stirring. The mixture was allowed to cool and dissolved in a large excess of 10% hydrochloric acid and extracted with benzene. The benzene extract was washed with 5% sodium carbonate aqueous solution and then water, dried, and filtered through a Buchner's funnel with a small amount of silica-gel for chromatographic use. The filtrate was condensed under reduced pressure to obtain 338 mg. of 3-(2-nitro-3-chlorophenyl)-4-chloropyrrole. This material was recrystallized from benzene to obtain 3 - (2 - nitro-3-chlorophenyl)-4-chloropyrrole as faint yellow prisms, M.P. 122–124° C.

Analysis.—Calculated for $C_{10}H_6O_2N_2Cl_2$: C, 46.72; H, 2.35; N, 10.90; Cl, 27.53. Found: C, 46.96; H, 2.54; N, 10.85; Cl, 27.29.

(ii) A mixture of 100 mg. of 3-(2-nitro-3-chlorophenyl)-4-chloropyrrole-2,5-dicarboxylic acid and 2 cc. of glycerine was heated at 210–220° C. for 15 minutes. After the solution was allowed to cool, to this solution was added 30 cc. of water. To this mixture, sodium chloride was added and the solution was extracted with benzene. The extract was washed with an aqueous solution of potassium hydrogen carbonate and water, and dried. The solvent was distilled off under reduced pressure. The residue was chromatographed on silica-gel with benzene as a solvent and the second fraction was collected. This fraction was condensed under reduced pressure and the residue was recrystallized from benzene to obtain 25 mg. of 3-(2-nitro-3-chlorophenyl)-4-chloropyrrole as faint yellow plates, M.P. 124° C.

The melting point of this material was not depressed by admixture with the specimen, 3-(2-nitro-3-chlorophenyl)-4-chloropyrrole, produced by a strain belonging to Pseudomonas genus. The infrared spectra of the two substances were completely identical.

(iii) A mixture of 3-(2-nitro-3-chlorophenyl)-4-chloropyrrole-2,5-dicarboxylic acid (100 mg.), quinoline (5 cc.) and the copper powders (100 mg.) was heated at 180–185° C. for 5 minutes and then the decarboxylation proceeded. After cooling, the mixture was dissolved in a large excess of 10% hydrochloric acid and the solution was extracted with bnezene.

The benzene extract was washed with 5% sodium carbonate aqueous solution, then with water and dried. The solution was filtered through a Buchner's funnel with a small amount of silica-gel and the filtrate was condensed to obtain 67 mg. of 3-(2-nitro-3-chlorophenyl)-4-chloropyrrole. (M.P. 124° C.)

(iv) 3 - (2 - nitro-3-chlorophenyl)-4-chloropyrrole-2,5-dicarboxylic acid (5 mg.) was floated in 0.2 cc. of concentrated sulfuric acid and the mixture was slowly heated; then the decarboxylation proceeded at about 70–90° C. The temperature was kept for several minutes. To the mixture was added ice cakes and the solution was extracted with benzene. The benzene extract was condensed.

The thin layer chromatography was developed bioautographically at the same position (Rf 0.45), giving a positive Ehrlich's test and showing the anti-microbial activity against Penicillium chrysogenum, with 3 - (2 - nitro - 3-chlorophenyl)-4-chloropyrrole as that of 3-(2-nitro-3-chlorophenyl)-4-chloropyrrole produced by a strain belonging to Pseudomonas genus.

Example 12

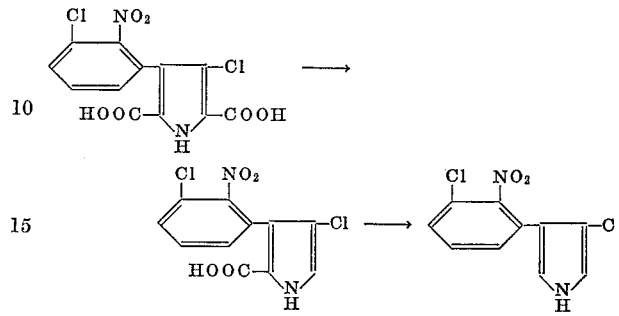

(i) 3 - (2 - nitro - 3 - chlorophenyl) - 4 - chloropyrrole-2,5-dicarboxylic acid (100 mg.) was dissolved in 4 cc. of dimethyaniline. The solution was heated at 180° C. for 45 minutes, allowed to cool, poured into 20 cc. of 10% hydrochloric acid and extracted with benzene. The benzene layer was dried, decolourized with active carbon and filtered. The filtrate was condensed under reduced pressure to obtain 70 mg. of 3-(2-nitro-3-chlorophenyl)-4-chloropyrrole-2-carboxylic acid, M.P. 265° C. (dec.).

(ii) A mixture of 20 mg. of 3-(2-nitro-3-chlorophenyl)-4-chloropyrrole-2-carboxylic acid and 5 cc. of glycerine was heated at 250° C. for 10 minutes and poured into 50 cc. of an ice-water. The solution was extracted with benzene and treated as described in Example 11(ii) to obtain 15 mg. of 3-(2-nitro-3-chlorophenyl)-4-chloropyrrole. The crystals were recrystallized from benzene to obtain the object substance, M.P. 124° C. This material was completely identical with the specimen, 3-(2-nitro-3-chlorophenyl)-4-chloropyrrole, produced by a strain belonging to Pseudomonas genus, with respect to the infrared absorption spectrum and the Rf values of the thin layer chromatography.

Example 13

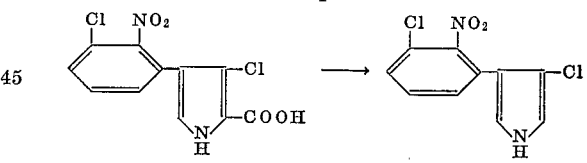

(i) 3 - (2 - nitro - 3 - chlorophenyl) - 4 - chloropyrrole-5-carboxylic acid (30 mg.) was floated in 0.2 cc. of concentrated sulfuric acid and the mixture was slowly heated; then the decarboxylation proceeded at about 70–90° C. The temperature was kept for several minutes. To the mixture was added ice cakes and the solution was extracted with benzene. The extract was chromatographed on silica-gel. The resultant fraction (the second fraction) giving a positive Ehrlich's test, was collected and the solvent was distilled off to obtain about 10 mg. of 3-(2-nitro-3-chlorophenyl)-4-chloropyrrole.

This material, submitted to the thin layer chromatography with chloroform as a solvent, gave a red-colored spot with Ehrlich's reagent at the same position (Rf 0.45) as that of 3-(2-nitro-3-chlorophenyl)-4-chloropyrrole produced by a strain belonging to Pseudomonas genus.

(ii) 3 - (2 - nitro - 3 - chlorophenyl) - 4 - chloropyrrole-5-carboxylic acid (100 mg.) was floated in 0.5 cc. of glycerine and the mixture was heated at 180–220° C. for 30 minutes.

The reactant was diluted with water and extracted with benzene. The extract was washed with an aqueous solution of sodium hydrogen carbonate, and after drying, the solvent was distilled off to obtain the residue containing 3-(2-nitro-3-chlorophenyl)-4-chloropyrrole.

This material was submitted to the thin layer chromatography with chloroform as a solvent and the developed spot had the Rƒ value of 0.45 and gave a positive Ehrlich's test.

(iii) 3 - (2 - nitro - 3 - chlorophenyl) - 4 - chloropyrrole-5-carboxylic acid (10 mg.) was heated at 220° C. under reduced pressure (1 mm. Hg); then the decarboxylation proceeded slowly and 3-(2-nitro-3-chlorophenyl)-4-chloropyrrole was sublimated. (M.P. 124° C.)

(iv) 3 - (2 - nitro - 3 - chlorophenyl) - 4 - chloropyrrole-5-carboxylic acid (200 mg.) was dissolved in 10 cc. of ethyl alcohol containing 4% dried hydrogen chloride. The solution was heated under reflux and poured into an ice-water and extracted with ethyl acetate. The extract was washed with water and 5% sodium carbonate aqueous solution, and condensed under reduced pressure. The residue was dissolved in benzene and the solution was washed with 5% sodium hydroxide aqueous solution and then water, dried, and filtered through a Buchner's funnel with a small amount of silica-gel for chromatographic use.

The filtrate was condensed under reduced pressure to obtain 3-(2-nitro-3-chlorophenyl)-4-chloropyrrole.

This material was completely identical with the specimen, 3-(2-nitro-3-chlorophenyl)-4-chloropyrrole, produced by a strain belonging to Pseudomonas genus, with respect to the infrared absorption spectrum and the thin layer chromatography.

Example 14

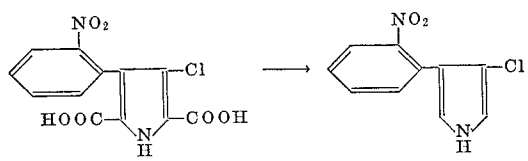

3 - (2 - nitrophenyl) - 4 - chloropyrrole - 2,5 - dicarboxylic acid (800 mg.) was dissolved in 8 cc. of dimethylaniline. The solution was heated under reflux with stirring for an hour, cooled and poured into 80 cc. of 10% hydrochloric acid. The solution was extracted with benzene and the benzene extract was washed with water and then with 5% sodium hydroxide aqueous solution. The solution was cooled and filtered through a Buchner's funnel with silica gel for chromatographic use, and the filtrate was condensed under reduced pressure. The residue was recrystallized from a benzene-ligroin mixture to obtain 60 mg. of 3-(2-nitrophenyl)-4-chloropyrrole as faint yellow needles, M.P. 111° C.

MIC: *Trichophyton interdigitale*, 20 γ/cc.

*Analysis.*—Calculated for $C_{10}H_7O_2N_2Cl$: C, 53.95; H, 3.17. Found: C, 53.97; H, 3.33.

Example 15

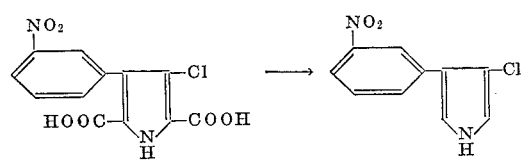

3-(3-nitrophenyl)-4-chloropyrrole-2,5-dicarboxylic acid (75.5 mg.) was suspended in 2 cc. of concentrated sulfuric acid and the suspension was heated at 120° C. in an oil bath for 10 minutes. The reaction mixture was immediately cooled, to which ice cakes was added, and extracted with ethyl acetate. The ethyl acetate extract was washed with an aqueous solution of sodium hydrogen carbonate and then with water and dried. The solvent was removed to obtain yellow crystals. The crude crystals were recrystallized from a mixture of benzene and petroleum benzine to obtain 31 mg. of 3-(3-nitrophenyl)-4-chloropyrrole, as yellow needles, M.P. 105° C.

*Analysis.*—Calculated for $C_{10}H_7O_2N_2Cl$: C, 53.95; H, 3.17; N, 12.62. Found: C, 54.08; H, 3.38; N, 12.81.

MIC: *Trichophyton interdigitale*, 20 γ/cc.

Example 16

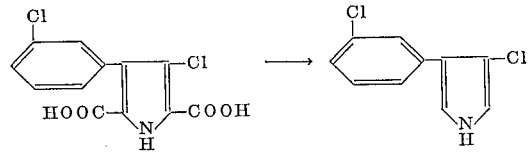

3-(3-chlorophenyl) - 4 - chloropyrrole-2,5-dicarboxylic acid (500 mg.) was dissolved in 5 cc. of dimethylaniline. The solution was heated under reflux with stirring for an hour, cooled and poured into 50 cc. of 10% hydrochloric acid. The solution was extracted with benzene and the benzene extract was washed with water and then with 5% sodium hydroxide aqueous solution. The solution was cooled and filtered through a Buchner's funnel with silica-gel for chromatographic use, and the filtrate was condensed under reduced pressure. The residue was distilled to obtain 400 mg. of 3-(3-chlorophenyl)-4-chloropyrrole as colourless liquid, B.P.$_{0.15}$ 145–147° C.

*Analysis.*—Calculated for $C_{10}H_7NCl_2$: C, 56.63; H, 3.33; Cl, 33.44. Found: C, 56.88; H, 3.46; Cl, 33.13.

MIC: *Staphylococcus aureus*, 10 γ/cc., *Escherichia coli*, 20 γ/cc., *Candida albicans*, 1 γ/cc., Mycobacterium 607, 20 γ/cc., *Trichophyton interdigitale*, 5 γ/cc.

Example 17

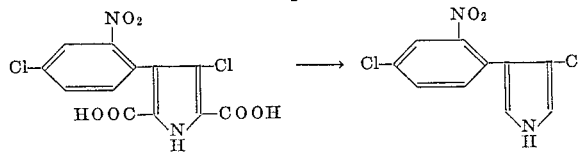

3-(2-nitro - 4 - chlorophenyl) - 4 - chloropyrrole-2,5-dicarboxylic acid (200 mg.) was dissolved in 2 cc. of dimethylaniline. The solution was heated under reflux with stirring for an hour, cooled and poured into 20 cc. of 10% hydrochloric acid. The solution was extracted with benzene and the benzene extract was washed with water and then with 5% sodium hydroxide aqueous solution. The solution was cooled and filtered through a Buchner's funnel with silica-gel for chromatographic use, and the filtrate was condensed under reduced pressure. The residue was recrystallized from a benzene-ligroin mixture to obtain 60 mg. of 3-(2-nitro-4-chlorophenyl)-4-chloropyrrole as faint yellow needles, M.P. 118° C.

*Analysis.*—Calculated for $C_{10}H_6O_2N_2Cl_2$: C, 46.71; H, 2.35. Found: C, 46.46; H, 2.64.

MIC: Mycobacterium 607, 40 γ/cc., *Trichophyton interdigitale*, 20 γ/cc.

Example 18

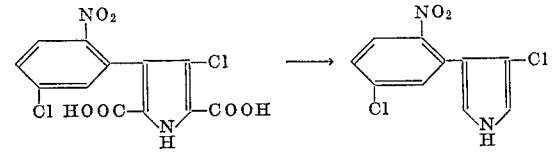

3-(2-nitro - 5 - chlorophenyl) - 4 - chloropyrrole-2,5-dicarboxylic acid (1.0 g.) was dissolved in 10 cc. of dimethylaniline. The solution was heated under reflux with stirring for an hour, cooled and poured into 100 cc. of 10% hydrochloric acid. The solution was extracted with benzene and the benzene extract was washed with water and then with 5% sodium hydroxide aqueous solution. The solution was cooled and filtered through a Buchner's funnel with silica-gel for chromatographic use, and the filtrate was condensed under reduced pressure. The residue was recrystallized from a benzene-ligroin mixture to obtain 200 mg. of 3-(2-nitro-5-chlorophenyl)-4-chloropyrrole as faint yellow needles, M.P. 106° C.

*Analysis.*—Calculated for $C_{10}H_6O_2N_2Cl_2$: N, 10.89. Found: N, 11.06.

Example 19

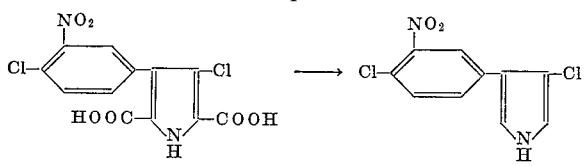

(i) 3 - (3-nitro-4-chlorophenyl)-4-chloropyrrole-2,5-di-carboxylic acid (40 mg.) was floated in 1 cc. of concentrated sulfuric acid and the mixture was heated at 120° C. in an oil bath for 5 minutes. The reaction mixture gave a faint violet color while foaming. To this solution, ice cakes were immediately added and the solution was extracted with ethyl acetate. The extract was washed with an aqueous solution of sodium hydrogen carbonate, the solution was washed with water and dried. The solvent was distilled off to obtain yellow crystals.

The crude crystals were chromatographed on silica-gel with benzene and recrystallized from a benzene-ligroin mixture to obtain 20 mg. of 3-(3-nitro-4-chlorophenyl)-4-chloropyrrole as yellow prisms, M.P. 114–115° C.

*Analysis.*—Calculated for $C_{30}H_6O_2N_2Cl_2$: C, 46.72; H, 2.35; N, 10.90; Cl, 27.53. Found: C, 46.99; H, 2.57; N, 11.07; Cl, 27.54.

(ii) 3 - (3 - nitro-4-chlorophenyl)-4-chloropyrrole-2,5-dicarboxylic acid (300 mg.) was dissolved in 3 cc. of dimethylaniline. The solution was heated under reflux with stirring for an hour, cooled and poured into 30 cc. of 10% hydrochloric acid. The solution was extracted with benzene and the benzene extract was washed with water and then with 5% sodium hydroxide aqueous solution. The solution was cooled and filtered through a Buchner's funnel with silica-gel for chromatographic use, and the filtrate was condensed under reduced pressure. The residue was recrystallized from a benzene-ligroin mixture to obtain 100 mg. of 3-(3-nitro-4-chlorophenyl)-4-chloropyrrole as faint yellow needles, M.P. 114° C.

Example 20

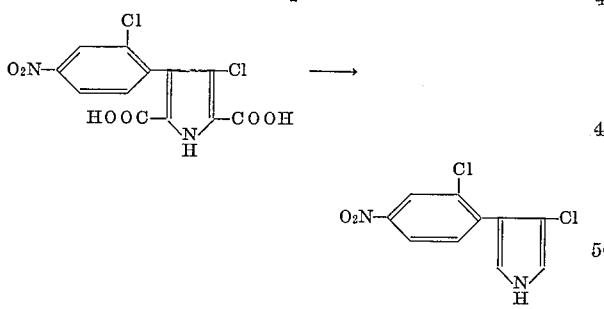

3 - (2 - chloro-4-nitrophenyl)-4-chloropyrrole-2,5-dicarboxylic acid (700 mg.) was dissolved in 7 cc. of dimethylaniline. The solution was heated under reflux with stirring for an hour, cooled and poured into 70 cc. of 10% hydrochloric acid. The solution was extracted with benzene and the benzene extract was washed with water and then with 5% sodium hydroxide aqueous solution. The solution was cooled and filtered through a Buchner's funnel with silica-gel for chromatographic use, and the filtrate was condensed under reduced pressure. The residue was recrystallized from a benzene-ligroin mixture to obtain 300 mg. of 3-(2-chloro-4-nitrophenyl)-4-chloropyrrole as orange needles, M.P. 184° C.

*Analysis.*—Calculated for $C_{10}H_6O_2N_2Cl_2$: N, 10.89. Found: N, 10.99.

Example 21

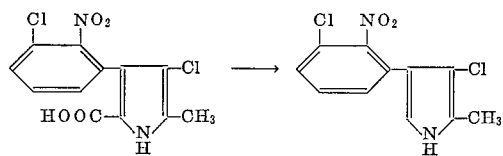

3 - (2 - nitro - 3 - chlorophenyl)-4-chloro-5-methylpyrrole-2-carboxylic acid (1.0 g.) was suspended in 30 cc. of dimethylaniline. The suspension was heated under reflux for 1.5 hours with vigorous stirring, allowed to cool, dissolved in a large excess of 10% hydrochloric acid and the solution was extracted with benzene. The benzene extract was washed with 5% sodium carbonate aqueous solution, dried and filtered through a Buchner's funnel with silica-gel for chromatographic use. The filtrate was condensed under reduced pressure to obtain 3-(2-nitro-3-chlorophenyl)-4-chloro-5-methylpyrrole. This material was recrystallized from an ether-hexane mixture to obtain 250 mg. of 3-(2-nitro-3-chlorophenyl)-4-chloro-5-methylpyrrole, M.P. 164–165° C.

The melting point of this material was not depressed by admixture with 3-(2-nitro-3-chlorophenyl)-4-chloro-5-methylpyrrole, prepared by reduction of [3-(2-nitro-3-chlorophenyl) - 4 - chloro-5-pyrrolyl] methyltrimethylammonium iodide. The infrared spectra of the two substances were completely identical.

MIC: *Trichophyton interdigitale*, 1 γ/cc.

Example 22

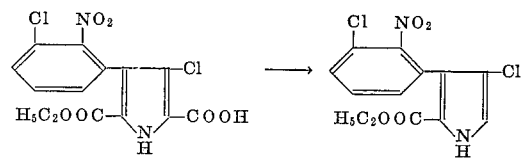

2 - ethoxycarbonyl - 3 - (2 - nitro - 3 - chlorophenyl)-4-chloropyrrole-5-carboxylic acid (1.5 g.) was dissolved in 20 cc. of dimethylaniline and the solution was heated under reflux for an hour with stirring. The solution was allowed to cool, poured into 200 cc. of 10% hydrochloric acid and extracted with benzene. The benzene layer was filtered through a Buchner's funnel with silica-gel for chromatographic use and the filtrate was condensed under reduced pressure. The residue was washed with ligroin and then recrystallized from absolute ethanol to obtain 250 mg. of ethyl 3-(2-nitro-3-chlorophenyl)-4-chloropyrrole-2-carboxylate as colourless fine needles, (M.P. 170–171° C.).

*Analysis.*—Calculated for $C_{13}H_{10}O_4N_2Cl_2$: C, 47.44; H, 3.06; N, 8.51; Cl, 21.54. Found: C, 47.57; H, 3.10; N, 8.57; Cl, 21.10.

Example 23

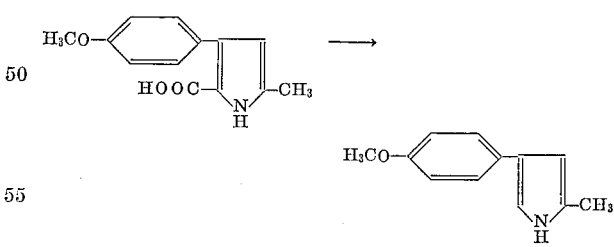

A mixture of 3-(4-methoxyphenyl)-5-methylpyrrole-2-carboxylic acid (280 mg.) and dimethylaniline (3 cc.) was heated with stirring in an oil-bath at 183–193° C. for 45 minutes, while passing nitrogen gas through it. The reaction mixture was cooled, diluted with water and extracted with ethyl ether. The resultant ether extract was washed with diluted sodium hydrogen carbonate aqueous solution, then with water, and dried. Ether was distilled off and the resultant residue was dissolved in benzene. The impurities were removed through a Buchner's funnel with silica-gel (0.5 g.) for chromatographic use. The resultant filtrate was condensed under reduced pressure to obtain a faint orange oily material. The material was allowed to stand in an ice-chamber to produce crystals. The resultant crystals were treated with a benzene-n-hexane mixture, to obtain 3-(4-methoxyphenyl)-5-methylpyrrole as colourless crystals having a melting point of 106–108° C.

The crystals displayed one peak of the imino group in the infrared spectrum at 3370 cm.$^{-1}$ and no peak of the carbonyl group.

Example 24

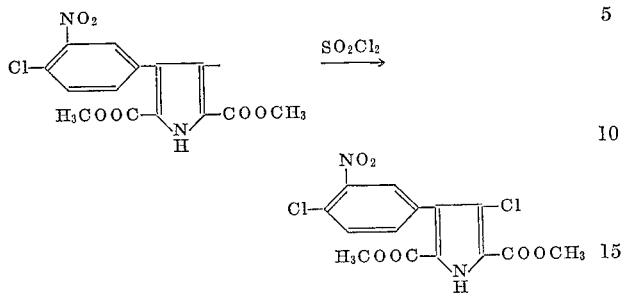

20 mg. of dimethyl 3-(3-nitro-4-chlorophenyl)pyrrole-2,5-dicarboxylate is suspended in 3 ml. of glacial acetic acid. This suspension is added with a solution of 30 mg. of sulfuryl chloride in 1 ml. of glacial acetic acid and then warmed to have a clear solution. To this solution, a small amount of iodine dissolved in acetic acid is added and the mixture is heated on a water bath at 60° C. for 5.5 hours. Heating is continued under reduced pressure and at a bath temperature of less than 55° C. until the mixture is concentrated to one-third by volume. The residual mass is added with water and then extracted with ethyl acetate. The extract is washed with an aqueous sodium hydrogen carbonate solution and then with water, and dried over anhydrous magnesium sulfate. From the liquid obtained, the solvent is removed by distillation. The residual solid mass is recrystallized from methanol, thereby yielding colorless crystalline dimethyl 3-(3-nitro-4-chlorophenyl)-4-chloropyrrole-2,5-dicarboxylate having a melting point of 207–209° C.

*Analysis.*—Calcd. for $C_{14}H_{10}O_6N_2Cl_2$: C, 45.05; H, 2.71. Found: C, 44.85; H, 2.66.

Example 25

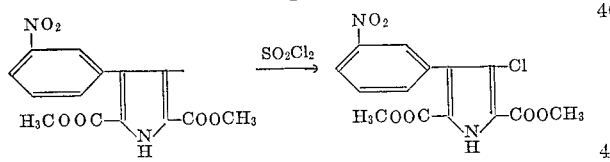

To the suspension of 20 mg. of dimethyl 3-(3-nitrophenyl)pyrrole-2,5-dicarboxylate in 1.55 ml. of glacial acetic acid, a solution of 12.4 mg. of sulfuryl chloride in 1.55 ml. of glacial acetic acid is added. The resulted mixture is worked up in the same manner as in Example 24, thereby to obtain 18.6 mg. of dimethyl 3-(3-nitrophenyl)-4-chloropyrrole-2,5-dicarboxylate having M.P. 202° C.

*Analysis.*—Calcd. for $C_{14}H_{11}O_6N_2Cl$: C, 49.64; H, 3.27; N, 8.28. Found: C, 49.89; H, 3.56; N, 8.16.

Example 26

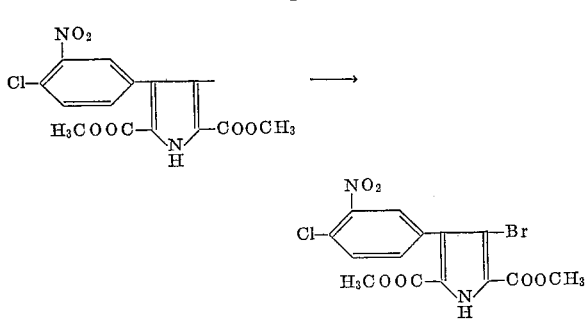

Dimethyl 3-(3-nitro-4-chlorophenyl)pyrrole-2,5-dicarboxylate (200 mg.) is dissolved into 25 ml. of glacial acetic acid with warming. To the resulting solution, 110 mg. of bromine in 5 ml. of glacial acetic acid is added dropwise, and then the mixture was stirred at 70° C. for 9 hours in a water bath. After completion of the reaction, the reaction mixture is poured into water, and the solution was extracted with ethyl acetate. The extract is washed with an aqueous solution of sodium hydrogen carbonate and then with water, and dried. The solvent was distilled off under reduced pressure to obtain colorless crystals. The crystals are recrystallized from benzene to obtain 152 mg. of dimethyl 3-(3-nitro-4-chlorophenyl)-4-bromopyrrole-2,5-dicarboxylate as colorless crystals having M.P. 189–191° C.

*Analysis.*—Calcd. for $C_{14}H_{10}O_6N_2BrCl$: C, 40.24; H, 2.42. Found: C, 40.45; H, 2.70.

Example 27

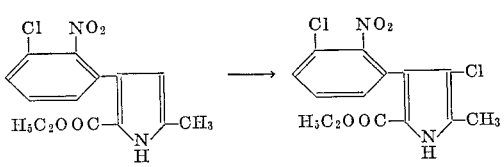

Ethyl 3-(2-nitro-3-chlorophenyl)-5-methylpyrrole-2-carboxylate (528 mg.) is suspended in 15 ml. of acetic acid. A solution of 231 mg. of sulfuryl chloride in 2 ml. of acetic acid is added at once to the above-resulted suspension with stirring at 60° C. The mixture is stirred for an hour at 60° C. After cooling, the separated crystals are collected by filtration. The crystals are recrystallized from ethanol to obtain 300 mg. of ethyl 3-(2-nitro-3-chlorophenyl)-4-chloro-5-methylpyrrole-2-carboxylate as colorless crystals having M.P. 249° C.

Example 28

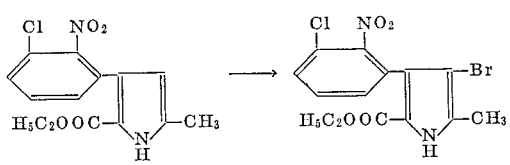

Ethyl 3-(2-nitro-3-chlorophenyl)-5-methylpyrrole-2-carboxylate (2.6 g.) is suspended in 25 ml. of acetic acid. A solution of 1.5 g. of bromine in 10 ml. of acetic acid is added dropwise to the above-resulted suspension and the mixture is warmed for an hour. After cooling, the separated crystals are collected by filtration and then recrystallized from ethanol to obtain 1.8 g. of ethyl 3-(2-nitro-3-chlorophenyl)-4-bromo-5-methylpyrrole-2-carboxylate as colorless prisms having M.P. 255° C. (dec.).

*Analysis.*—Calcd. for $C_{14}H_{12}O_4N_2BrCl$: C, 43.38; H, 3.12; N, 7.23. Found: C, 43.45; H, 3.19; N, 6.93.

Example 29

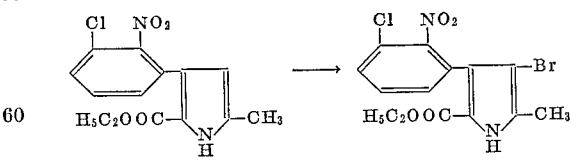

Ethyl 3-(2-nitro-3-chlorophenyl)-5-methylpyrrole-2-carboxylate (542 mg.) is floated on 10 ml. of tetrachloroethane. Bromine (280 mg.) is added to the above at 60° C. with stirring and the mixture is kept at 60° C. for 10 minutes. After cooling, the reaction mixture is washed with water and then with an aqueous solution of potassium hydrogen carbonate and then dried over anhydrous magnesium sulfate. Thereafter, the solvent is distilled off. The residue is recrystallized from ethanol to obtain 300 mg. of ethyl 3-(2-nitro-3-chlorophenyl)-4-bromo-5-methylpyrrole-2-carboxylate as colorless prisms having M.P. 255° C. (dec.).

Example 30

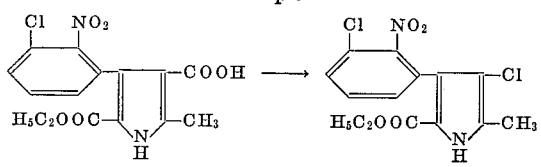

2-ethoxycarbonyl-3-(2 - nitro -3 - chlorophenyl) - 5-methylpyrrole-4-carboxylic acid (352 mg.) is suspended in 5 ml. of acetic acid. To the resulting suspension, a solution of 135 mg. of sulfuryl chloride in 2 ml. of acetic acid is added at once with stirring at 70° C. The mixture is treated in the same manner as described in Example 27 to obtain 200 mg. of ethyl 3-(2-nitro-3-chlorophenyl)-4-chloro-5-methylpyrrole-2-carboxylate having M.P. 249° C.

Example 31

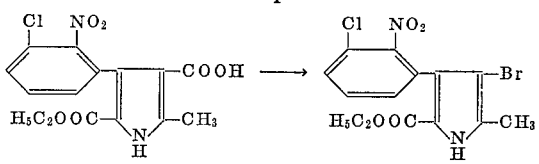

2-ethoxycarbonyl - 3 - (2-nitro - 3 - chlorophenyl)-5-methylpyrrole-4-carboxylic acid (352 mg.) is suspended in 5 ml. of acetic acid. To the resulting suspension, a solution of 135 mg. of bromine in 2 ml. of acetic acid is added with stirring at 70° C. The mixture is treated in the same manner as described in Example 28 to obtain 220 mg. of ethyl 3-(2-nitro-3-chlorophenyl)-4-bromo-5 - methylpyrrole-2-carboxylate having M.P. 255° C. (dec.).

Example 32

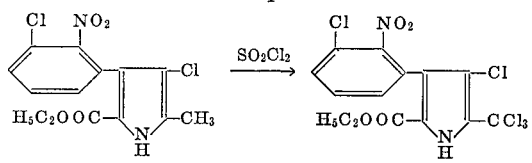

200 mg. of ethyl 3-(2-nitro-3-chlorophenyl)-4-chloro-5-methylpyrrole-2-carboxylate are suspended in 2 ml. of acetic acid. To the resulted suspension, with stirring, a solution of 266 mg. of sulfuryl chloride in 0.5 ml. of acetic acid is added dropwise, whereby the suspended crystalline solids disappear. After standing overnight, the resulted mixture is heated at 55° C. for 3.5 hours, and then poured into 20 ml. of ice water. The reaction mixture thus obtained is extracted with ethyl acetate. The extract is washed with an aqueous solution of potassium hydrogen carbonate, dried over anhydrous magnesium sulfate and then concentrated to leave 150 mg. of ethyl 3-(2-nitro-3-chlorophenyl)-4-chloro - 5 - trichloromethyl-pyrrole-2-carboxylate as dark red, viscous oil.

This compound is identified by the following way: It is dissolved in acetic acid and the resulting solution is heated at reflux for 30 minutes, thereby to form the 2-ethoxycarbonyl - 3-(2-nitro-3-chlorophenyl)-4-chloropyrrole-5-carboxylic acid which has a melting point of 262° C. (decomp.).

Example 33

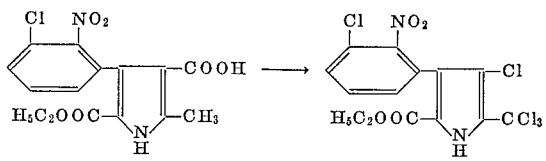

2-ethoxycarbonyl - 3 - (2-nitro - 3 - chlorophenyl)-5-methylpyrrole-4-carboxylic acid (352 mg.) is suspended in 5 ml. of acetic acid. To the suspension, a solution of 567 mg. of sulfuryl chloride in 2 ml. of acetic acid is added slowly dropwise with stirring at room temperature for 3 days. After allowing to stand, the mixture is warmed at 70° C. for 4 hours and then poured into ice water. The solution is extracted with ethyl acetate, and the extract is dried over anhydrous magnesium sulfate, and then concentrated to obtain 200 mg. of crude ethyl 3-(2-nitro-3-chlorophenyl)-4-chloro-5-trichloromethyl-2-carboxylate.

This compound is solvolyzed by refluxing in 90% acetic acid. The resulting solvolysis product is identified as 2-ethoxycarbonyl-3-(2-nitro-3-chlorophenyl) - 4 - chloropyrrole-5-carboxylic acid having M.P. 262° C. (dec.) and it shows the following elementary analysis:

Calcd. for $C_{14}H_{10}O_6N_2Cl_2$: C, 45.06; H, 2.70; Cl, 19.00. Found: C, 45.32; H, 2.90; Cl, 19.19.

Example 34

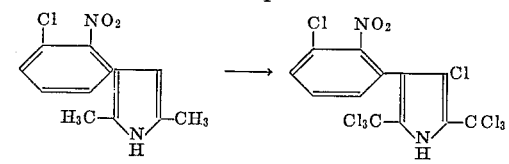

500 mg. of 2,5-dimethyl-3-(2-nitro-3-chlorophenyl)-pyrrole dissolved in 5 ml. of acetic acid is added gradually with a solution of 2.16 g. of sulfuryl chloride in 3 ml. of acetic acid with cooling. Stirring is continued at room temperature for three days. Then, the reaction mixture is poured into 50 ml. of ice water. The mixture is extracted with ethyl acetate. The extract is dried over anhydrous magnesium sulfate and concentrated in vacuo thereby leaving 400 mg. of crude 2,5-di-(trichloromethyl)-3-(2-nitro-3-chlorophenyl)-4-chloropyrrole as viscous oil.

This compound can be identified by the following way: This crude compound (400 mg.) in 10 ml. of acetic acid is refluxed for 1.5 hours, after which the reaction mixture is poured into 20 ml. of ice water. Then the solution is extracted with ethyl acetate. The objective substance is transferred to 5% aqueous sodium hydroxide from the above extract. The aqueous sodium hydroxide layer is acidified with 10% hydrochloric acid and then extracted with ethyl acetate. The extract is dried over anhydrous magnesium sulfate and then concentrated under reduced pressure to obtain 3-(2-nitro-3-chlorophenyl)-4-chloropyrrole-2,5-dicarboxylic acid. Decarboxylation of the said material by heating in dimethylaniline yields 3-(2-nitro-3-chlorophenyl)-4-chloropyrrole which has M.P. 124° C. and does not show any depression in melting point when mixed with an authentic sample obtained by the fermentation process of a strain of Pseudomonas.

Example 35

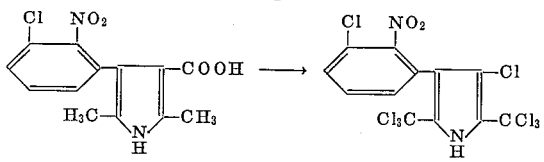

700 mg. of 2,5-dimethyl-3-(2-nitro-3-chlorophenyl)-pyrrole-4-carboxylic acid is dissolved in 7 ml. of purified glacial acetic acid. To the resulting solution, a solution of 2.5 g. of sulfuryl chloride in 11.5 ml. of glacial acetic acid is added dropwise at 20° C. At that temperature, stirring is continued for 48 hours, and then, the mixture is poured into ice water. The crystalline mass which separates out is extracted with ethyl ether. The extract is washed with water and dried over anhydrous magnesium sulfate, and then the solvent is distilled off, thereby leaving 2,5-di-(trichloromethyl)-3-(2-nitro-3-chlorophenyl)-4-chloropyrrole.

This compound can be identified by the following way: It is heated with 30 ml. of acetic acid under reflux for 1.5 hours, and the resulting reaction mixture is concentrated under reduced pressure. The crystalline residue is washed with a small portion of acetic acid. 100 mg. of 3-(2-nitro-3-chlorophenyl)-4-chloropyrrole-2,5-dicarboxylic acid is obtained. Decarboxylation of the said material by heating in glycerine yields 3-(2-nitro-3-chlorophenyl)-4-chloropyr-

27 role which does not show any depression in melting point when mixed with an authentic sample obtained by the fermentation process of a strain of Pseudomonas and which has an infrared absorption spectrum fully identical with that of the authentic sample.

Example 36

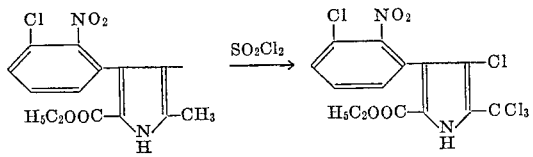

1.2 g. of ethyl 3-(2-nitro-3-chlorophenyl)-5-methylpyrrole-2-carboxylate is suspended in 12 ml. of acetic acid. A solution of 2.1 g. of sulfuryl chloride in 3 ml. of acetic acid is added dropwise to the suspension with stirring at about 20° C. The reaction mixture stood overnight is stirred for one hour at 30° C., one hour at 40° C. and then two hours at 50° C. Thereafter, this mixture is poured into ice water. The mixture is extracted with ethyl acetate. The extract is washed with an aqueous solution of potassium hydrogen carbonate and dried over anhydrous magnesium sulfate, and then the solvent was distilled off. Ethyl 3-(2-nitro-3-chlorophenyl)-4-chloro-5-trichloromethylpyrrole-2-carboxylate is obtained as pale-brown viscous oil.

Identification of this product can be made in the following manner: The product is dissolved in 20 ml. of 90% acetic acid, and the resulting solution is heated under reflux for one hour. The reaction mixture is cooled, and the crystalline mass thereby separated out is recrystallized from acetic acid, to yield 950 mg. of the 2-ethoxycarbonyl-3-(2-nitro-3-chlorophenyl)-4-chloropyrrole-5-carboxylic acid as colorless needles. This carboxylic acid has a melting point of 262° C. (decomp.) and the result of its elementary analysis is shown below:

28

Calcd. for $C_{14}H_{10}O_6N_2Cl_2$: C, 45.06; H, 2.70; Cl, 19.00.
Found: C, 45.32; H, 2.90; Cl, 19.17.

Examples 37–45

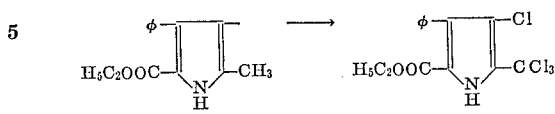

($\phi$: Substituted phenyl.)

The specified amount of ethyl-3-(substituted phenyl)-5-methylpyrrole-2-carboxylate is suspended in ten times amount of acetic acid. To the resulting suspension, with water-cooling and stirring, an acetic acid solution containing the specified amount of sulfuryl chloride is added dropwise. The reaction mixture is allowed to stand overnight at room temperature, and then warmed to 70° C. After cooling this mixture, it is poured into ice water in amount of 200 parts per part of the starting material. The total mixture is extracted with ethyl acetate. The extract is dried over anhydrous magnesium sulfate and then concentrated under reduced pressure. A corresponding ethyl 3-(substituted phenyl)-4-chloro-5-trichloromethylpyrrole-2-carboxylate is obtained as viscous, dark red oil in the specified yield.

These compounds are confirmed by converting to the corresponding 2-ethoxycarbonyl-3-(substituted phenyl)-4-chloro-5-carboxylic acid in the folowing manner: Ethyl 3-(substituted phenyl)-4-chloro-5-trichloromethylpyrrole-2-carboxylates is dissolved into acetic acid in amount of 15 parts per part of the starting material. The mixture is refluxed for an hour, after which the reaction mixture is concentrated under reduced pressure. The crystalline residue is washed with a little volume of benzene and then collected by filtration. The crystals are recrystallized from acetic acid to obtain 2-ethoxycarbonyl-3-(substituted phenyl)-4-chloro-5-carboxylic acid.

| Example Number | Ethyl 3-(substituted phenyl)-4-chloro-5-trichloromethylpyrrole-2-carboxylates (I) | | | | 2-ethoxycarbonyl-3-(substituted phenyl)-4-chloro-5-carboxylic acids (II) | | | Elementary analysis [1] | | | |
|---|---|---|---|---|---|---|---|---|---|---|---|
| | Substituted phenyl | Amount of starting material, g. | Amount of sulfuryl chloride, g. | Yield, g. | Melting point (dec.), °C. | Crystal form | Molecular formula | C | H | N | Cl |
| 37 | Cl—⟨NO₂⟩— | 1.3 | 2.1 | 1.0 | 239 | Pale red needles | $C_{14}H_{10}O_6N_2Cl_2$ | | | 7.51 7.80 | |
| 38 | ⟨NO₂⟩— | 2.0 | 4.4 | 2.0 | 259 | Colorless needles | $C_{14}H_{11}O_6N_2Cl$ | 49.64 49.40 | 3.27 3.55 | 8.27 8.03 | |
| 39 | Cl—⟨NO₂⟩— | 1.0 | 1.9 | 1.0 | 220 | ...do... | $C_{14}H_{10}O_6N_2Cl_2$ | 45.06 45.08 | 2.70 2.78 | 7.51 7.61 | 19.00 18.84 |
| 40 | ⟨NO₂, Cl⟩— | 2.0 | 3.8 | 2.1 | 222 | Pale yellow needles | $C_{14}H_{10}O_6N_2Cl_2$ | 45.06 45.11 | 2.70 2.85 | 7.51 7.59 | 19.00 18.89 |
| 41 | O₂N—⟨Cl⟩— | 2.0 | 3.8 | 2.0 | 250 | Colorless cubes | $C_{14}H_{10}O_6N_2Cl_2$ | 45.06 45.09 | 2.70 2.83 | 7.51 7.70 | 19.00 18.77 |
| 42 | ⟨Cl⟩— | 1.7 | 3.7 | 1.3 | 264 | Pink needles | $C_{14}H_{11}O_4NCl_2$ | 51.24 51.19 | 3.83 3.43 | 4.27 4.22 | 21.61 21.85 |

| Example Number | Ethyl 3-(substituted phenyl)-4-chloro-5-trichloromethylpyrrole-2-carboxylates (I) | | | 2-ethoxycarbonyl-3-(substituted phenyl)-4-chloro-5-carboxylic acids (II) | | | | Elementary analysis [1] | | | |
|---|---|---|---|---|---|---|---|---|---|---|---|
| | Substituted phenyl | Amount of starting material, g. | Amount of sulfuryl chloride, g. | Yield, g. | Melting point (dec.), °C. | Crystal form | Molecular formula | C | H | N | Cl |
| 43 | 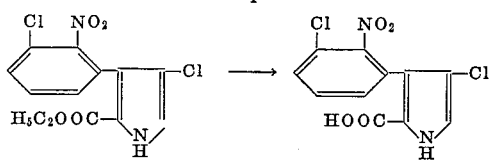 | 1.6 | 3.8 | 1.3 | 235 | ......do...... | $C_{14}H_{11}O_4NCl_2$ | 51.24 / 51.31 | 3.38 / 3.64 | 4.27 / 4.51 | 21.61 / 21.93 |
| 44 | 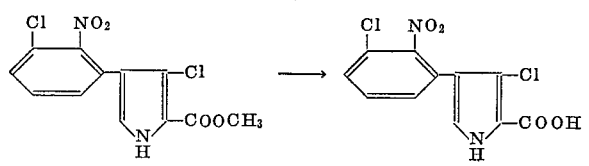 | 1.6 | 3.3 | 1.5 | 270 | Colorless needles | $C_{14}H_{10}O_4NCl_3$ | 46.37 / 46.32 | 2.78 / 2.95 | 3.86 / 3.76 | 29.33 / 29.19 |
| 45 | 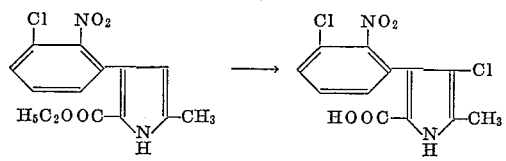 | 1.5 | 2.9 | 1.0 | 270 | ......do...... | $C_{14}H_{11}O_4NBrCl$ | 45.13 / 44.95 | 3.38 / 3.17 | 3.76 / 3.91 | |

[1] In the column, the figures shown in the upper line indicate the calculated values and those in the lower line indicate the experimental values.

Example 46

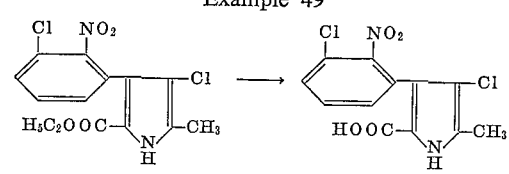

Ethyl 3 - (2 - nitro - 3 - chlorophenyl) - 4 - chloropyrrole-2-carboxylate (200 mg.) was dissolved in 5% sodium hydroxide aqueous soltuion (5 cc.) and ethanol (5 cc.). The solution was heated under reflux for three and a half hours. After that time, the solution was cooled and acidified with 10% sulfuric acid, and then 50 cc. of water was added thereto. The solution was extracted with ethyl acetate. The extract was dried and the solvent distilled off. 3-(2-nitro-3-chlorophenyl)-4-chloropyrrole-2-carboxylic acid was obtained quantatively as a light yellow crystalline powder, having a melting point of 250° C. (decomp.).

Infrared absorption spectrum:

$\nu_{CO}$: 1680 cm.$^{-1}$

Example 47

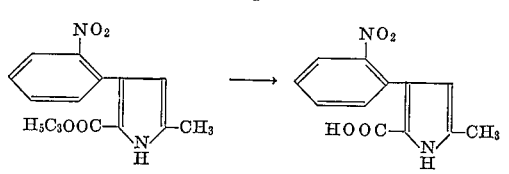

Methyl 3 - (2 - nitro - 3 - chlorophenyl) - 4 - chloropyrrole-5-carboxylate (200 mg.) was treated as described in Example 46. The resulted crystalline product was recrystallized from an ether-hexane mixture to yield 150 mg. of 3-(2-nitro-3-chlorophenyl)-4-chloropyrrole-5-carboxylic acid as colorless fine needles having a melting point of 215° C. (decomp.).

*Analysis.*—Calcd. for $C_{11}H_6O_4N_2Cl_2$: C, 43.88; H, 2.01; N, 9.31. Found: C, 44.03; H, 2.16; N, 9.52.

Example 48

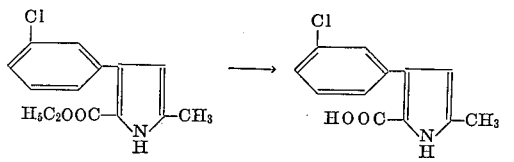

Ethyl 3 - (2 - nitro - 3 - chlorophenyl) - 5 - methylpyrrole-2-carboxylate (200 mg.) was treated as described in Example 46. The resulted crystalline product was recrystallized from a mixture of ethyl acetate and ligroin to yield 130 mg. of 3-(2-nitro-3-chlorophenyl)-5-methylpyrrole-2-carboxylic acid as colorless needles having a melting point of 211° C. (decomp.).

*Analysis.*—Calcd. for $C_{12}H_9O_4N_2Cl$: C, 51.35; H, 3.23; N, 9.98. Found: C, 51.52; H, 3.41; N, 9.73.

Example 49

A mixture of ethyl 3-(2-nitro-3-chlorophenyl)-4-chloro-5-methylpyrrole-2-carboxylate (500 mg.), 10% sodium hydroxide aqueous solution (12 cc.) and ethanol (4 cc.) was heated under reflux for 4 hours. The reaction mixture was cooled and then poured into 12 cc. of 10% sulfuric acid. The resulting solution was diluted with 40 cc. of water and extracted with ethyl acetate. The extract was dried, and then concentrated to yield 400 mg. of crude material. The crude material was recrystallized from a mixture of 95% ethanol and petroleum benzine to yield 3 - (2 - nitro - 3 - chlorophenyl) - 4 - chloro - 5 - methylpyrrole-2-carboxylic acid, M.P. 248–249° C. (decomp.).

Example 50

A mixture of 1.0 g. of ethyl 3-(2-nitrophenyl)-5-methylpyrrole-2-carboxylate, 30 cc. of 10% sodium hydroxide aqueous solution and 10 cc. of ethanol was heated under reflux for 4 hours. The reaction mixture was cooled and then poured into 30 cc. of 10% sulfuric acid. The resulting solution was diluted with 100 cc. of water and extracted with ethyl acetate. The extract was dried and then concentrated to obtain 0.6 g. of 3-(2-nitrophenyl)-5-methylpyrrole-2-carboxylic acid.

Example 51

A mixture of 4.0 g. of ethyl 3-(3-chlorophenyl)-5-methylpyrrole-2-carboxylate, 120 cc. of 10% sodium hydroxide aqueous solution and 40 cc. of ethanol was heated under reflux for 4 hours. The reaction mixture was cooled and then poured into 120 cc. of 10% sulfuric acid. The resulting solution was diluted with 400 cc. of water and extracted with ethyl acetate. The extract was dried and then concentrated to obtain 2.1 g. of 3-(3-chlorophenyl)-5-methylpyrrole-2-carboxylic acid.

Identification of this compound was made by decarboxylating it with dimethylaniline into 3-(3-chlorophenyl)-5-methylpyrrole as colorless crystals having a melting point of 60–61° C. and the following analytical value.

*Analysis.*—Calcd. for C₁₁H₁₀NCl: C, 68.93; H, 5.26; Cl, 18.50. Found: C, 68.83; H, 5.39; Cl, 18.20.

Example 52

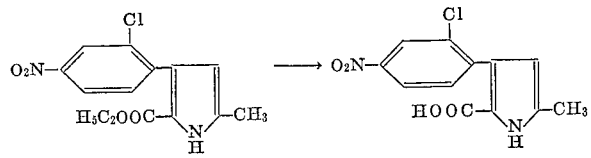

A mixture of 1.0 g. of ethyl 3-(2-chloro-4-nitrophenyl)-5-methylpyrrole-2-carboxylate, 30 cc. of 10% sodium hydroxide aqueous solution and 10 cc. of ethanol was heated under reflux for 4 hours. The reaction mixture was cooled and then poured into 30 cc. of 10% sulfuric acid. The resulting solution was diluted was 100 cc. of water and extracted with ethyl acetate. The extract was dried and then concentrated to obtain 0.6 g. of 3-(2-chloro-4-nitrophenyl)-5-methylpyrrole-2-carboxylic acid.

Identification of this compound was made by decarboxylating it with dimethylaniline into 3-(2-chloro-4-nitrophenyl)-5-methylpyrrole as reddish orange crystals having a melting point of 165–167° C. and the following analytical value.

*Analysis.*—Calcd. for C₁₁H₉O₂N₂Cl: C, 55.83; H, 3.83; N, 11.84; Cl, 14.88. Found: C, 55.80; H, 3.99; N, 11.86; Cl, 14.90.

Example 53

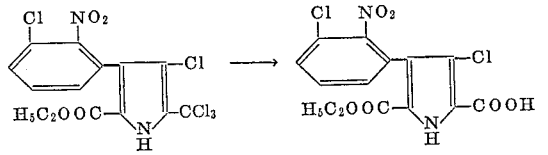

(i) Ethyl 3-(2-nitro-3-chlorophenyl)-4-chloro-5-trichloromethylpyrrole-2-carboxylate (ca. 4.5 g.) was dissolved in 90% acetic acid and the mixture was heated under reflux for an hour. The produced crystals were collected to yield 4.2 g. of crude product. The product was recrystallized from acetic acid to yield ca. 3 g. of pure 2-ethoxycarbonyl-3-(2-nitro-3-chlorophenyl)-4-chloropyrrole-5-carboxylic acid as colorless needles, having a melting point of 262° C. (decomp.).

*Analysis.*—Calcd. for C₁₄H₁₀O₆N₂Cl₂: C, 45.06; H, 2.70; N, 7.51; O, 25.73; Cl, 19.00. Found: C, 45.32; H, 2.90; N 7.75; O, 25.85; Cl, 19.17.

(ii) Ethyl 3-(2-nitro-3-chlorophenyl)-4-chloro-5-trichloromethylpyrrole-2-carboxylate prepared from 400 mg. of ethyl 3-(2-nitro-3-chlorophenyl)-5-methylpyrrole-2-carboxylate and sulfuryl chloride, was stirred for an hour at room temperature with 5 cc. of an aqueous solution saturated with potassium hydrogen carbonate and 2 cc. of 2-ethoxyethanol. The mixture solution was diluted with water and acidified with dilute sulfuric acid. The resulting acidic solution was extracted with ethyl acetate and the extract was dried. The solvent was distilled off to yield 300 mg. of 2-ethoxycarbonyl-3-(2-nitro-3-chlorophenyl)-4-chloropyrrole-5-carboxylic acid, M.P. 262° C. (decomp.).

Example 54

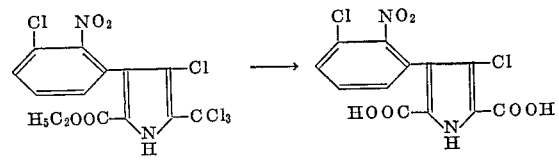

A mixture of ethyl 3-(2-nitro-3-chlorophenyl)-4-chloro-5-trichloromethylpyrrole-2-carboxylate, prepared from 40 mg. of ethyl 3-(2-nitro-3-chlorophenyl)-4-chloro-5-methylpyrrole-2-carboxylate and sulfuryl chloride, and 5 cc. of 10% sodium hydroxide aqueous solution was heated for two hours on a water bath. The reaction mixture was acidified with 10% sulfuric acid and the resultant acidic solution was treated as described in Example 53(ii) to yield 370 mg. of 3-(2-nitro-3-chlorophenyl)-4-chloropyrrole-2,5-dicarboxylic acid having a melting point of 298° C. (decomp.).

Example 55

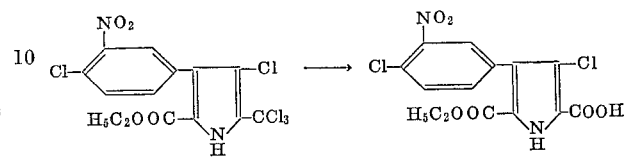

Ethyl 3-(3-nitro-4-chlorophenyl)-4-chloro-5-trichloromethylpyrrole-2-carboxylate (1.0 g.) was dissolved in about 15 cc. of acetic acid. The resultant solution was heated under reflux for an hour and then concentrated under reduced pressure. The residual crystalline substance was washed with a small amount of benzene, filtered and recrystallized from acetic acid to yield 0.5 g. of 2-ethoxycarbonyl-3-(3-nitro-4-chlorophenyl)-4-chloropyrrole-5-carboxylic acid as light crimson needles having a melting point of 239° C. (decomp.).

*Analysis.*—Calcd. for C₁₄H₁₀O₆N₂Cl₂: N, 7.51. Found: N, 7.80.

Example 56

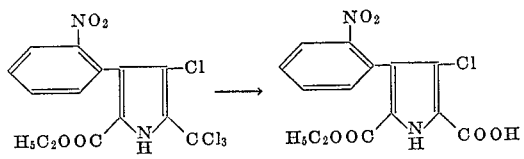

Ethyl 3-(2-nitrophenyl)-4-chloro-5-trichloromethylpyrrole-2-carboxylate (2.0 g.) was dissolved in about 30 cc. of acetic acid. The solution was heated under reflux and then concentrated under reduced pressure. The residual crystalline substance was washed with a small amount of benzene, filtered and recrystallized from acetic acid to obtain 1.3 g. of 2-ethoxycarbonyl-3-(2-nitrophenyl)-4-chloropyrrole-5-carboxylic acid as colorless needles, M.P. 259° C. (decomp.).

*Analysis.*—Calcd. for C₁₄H₁₁O₆N₂Cl: C, 49.64; H, 3.27; N, 8.27. Found: C, 49.40; H, 3.55; N, 8.03.

Example 57

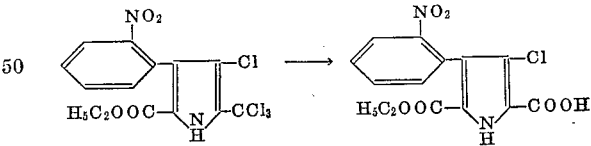

Ethyl 3-(2-nitro-4-chlorophenyl)-4-chloro-5-trichloromethylpyrrole-2-carboxylate (1.0 g.) was dissolved in about 15 cc. of acetic acid. The solution was heated under reflux and then concentrated under reduced pressure. The residual crystalline substance was washed with a small amount of benzene, filtered and recrystallized from acetic acid to obtain 400 mg. of 2-ethoxycarbonyl-3-(2-nitro-4-chlorophenyl)-4-chloropyrrole-5-carboxylic acid as colorless needles, M.P. 220° C. (decomp.).

*Analysis.*—Calcd. for C₁₄H₁₀O₆N₂Cl₂: N, 7.51. Found: N, 7.61.

Example 58

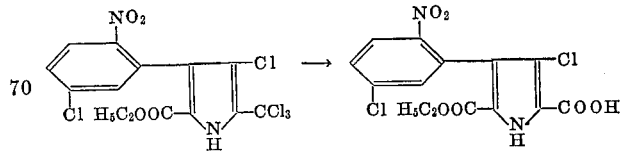

Ethyl 3-(2-nitro-5-chlorophenyl)-4-chloro-5-trichloromethylpyrrole-2-carboxylate (2.1 g.) was dissolved in about 30 cc. of acetic acid. The solution was heated under reflux and then concentrated under reduced pressure. The residual crystalline substance was washed with a small amount of benzene, filtered and recrystallized from acetic acid to obtain 1.5 g. of 2-ethoxycarbonyl-3-(2-nitro-5-chlorophenyl)-4-chloropyrrole-5-carboxylic acid as light yellow needles, M.P. 222° C. (decomp.).

*Analysis.*—Calcd. for $C_{14}H_{10}O_6N_2Cl_2$: C, 45.06; H, 2.70; N, 7.51; Cl, 19.00. Found: C, 45.11; H, 2.85; N, 7.59; Cl, 18.89.

Example 59

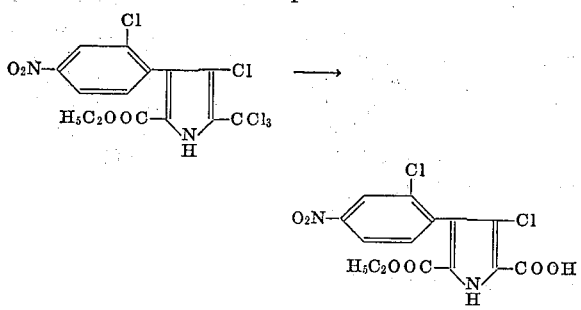

Ethyl 3 - (2 - chloro - 4 - nitrophenyl) - 4 - chloro - 5 - trichloromethylpyrrole-2-carboxylate (2.0 g.) was dissolved in about 30 cc. of acetic acid. The solution was heated under reflux and then concentrated under reduced pressure. The residual crystalline substance was washed with small amount of benzene, filtered and recrystallized from acetic acid to obtain 1.1 g. of 2-ethoxycarbonyl-3-(2 - chloro - 4 - nitrophenyl) - 4 - chloropyrrole - 5 - carboxylic acid as colorless prisms, M.P. 250° C. (decomp.).

*Analysis.*—Calcd. for $C_{14}H_{10}O_6N_2Cl_2$: C, 45.06; H, 2.70; N, 7.51; Cl, 19.00. Found: C, 45.09; H, 2.83; N, 7.70; Cl, 18.77.

Example 60

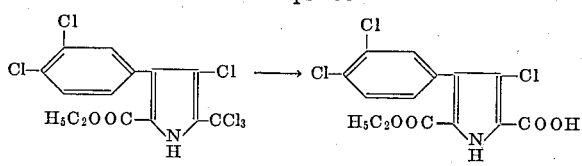

Ethyl 3 - (3,4 - dichlorophenyl) - 4 - chloro - 5 - trichloromethylpyrrole-2-carboxylate (1.5 g.) was dissolved in about 25 cc. of acetic acid. The solution was heated under reflux and then concentrated under reduced pressure. The residual crystalline substance was washed with a small amount of benzene, filtered and recrystallized from acetic acid to obtain 1.0 g. of 2-ethoxycarbonyl-3-(3,4 - dichlorophenyl) - 4 - chloropyrrole - 5 - carboxylic acid as colorless needles, M.P. 276° C. (decomp.).

*Analysis.*—Calcd. for $C_{14}H_{10}O_4NCl_3$: C, 46.37; H, 2.78; N, 3.86; Cl, 29.33. Found: C, 46.32; H, 2.95; N, 3.76; Cl, 29.19.

Example 61

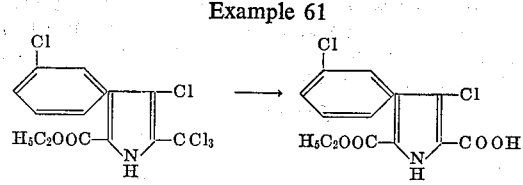

Ethyl 3 - (3 - chlorophenyl) - 4 - chloro - 5 - trichloromethylpyrrole-2-carboxylate (1.3 g.) was dissolved in about 20 cc. of acetic acid. The solution was heated under reflux and then concentrated under reduced pressure. The residual crystalline substance was washed with a small amount of benzene, filtered and recrystallized from acetic acid to obtain 0.9 g. of 2-ethoxycarbonyl-3-(3-chlorophenyl-4-chloropyrrole-5-carboxylic acid as light red needles, M.P. 235° C. (decomp.).

*Analysis.*—Calcd. for $C_{14}H_{11}O_4NCl_2$: C, 51.24; H, 3.38; N, 4.27; Cl, 21.61. Found: C, 51.38; H, 3.64; N, 4.51; Cl, 21.93.

Example 62

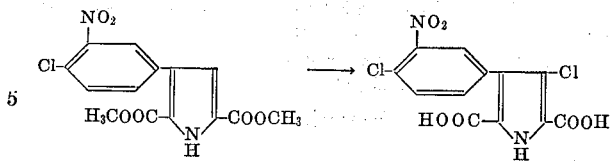

A mixture of 95 mg. of dimethyl 3-(3-nitro-4-chlorophenyl)pyrrole-2,5-dicarboxylate, 135 mg. of potassium hydroxide, 38 cc. of 95% ethanol and 11.4 cc. of water was heated under reflux. After the reaction was completed, ethanol was distilled off under reduced pressure. The residue was added with water and then acidified with hydrochloric acid, and the resulting solution was extracted with ethyl acetate. The extract was washed with water and then dried, and ethyl acetate was distilled off under reduced pressure to obtain 89 mg. of 3-(3-nitro-4-chlorophenyl)pyrrole-2,5-dicarboxylic acid.

Infrared absorption spectrum:

$\nu$NH: 3330 cm.$^{-1}$
$\nu$CO: 1695 cm.$^{-1}$
$\nu$NO$_2$: 1530 and 1340 cm.$^{-1}$ Example 63

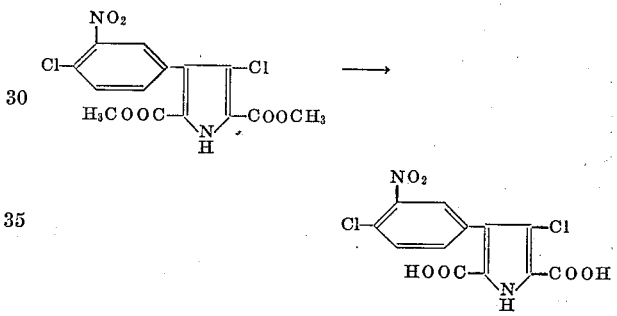

A mixture of 120 mg. of dimethyl 3-(3-nitro-4-chlorophenyl)-4-chloropyrrole-2,5-dicarboxylate, 150 mg. of potassium hydroxide and 20 cc. of 95% ethanol was heated under reflux for 1.5 hours. Thereafter 5 cc. of water was added thereto and further heating was conducted for 4 hours. Ethanol was distilled off under reduced pressure. The residual solution was diluted with water and washed twice with ethyl acetate. The aqueous layer was acidified with hydrochloric acid and extracted with ethyl acetate. The extract was washed with water and then dried. The solvent was distilled off to obtain crude product, which was then recrystallized from aqueous ethanol to obtain 3 - (3 - nitro - 4 - chlorophenyl) - 4 - chloropyrrole - 2,5-dicarboxylic acid as colorless crystals, M.P. 280° C. (decomp.).

*Analysis.*—Calcd. for $C_{12}H_6O_6N_2Cl_2$: C, 41.76; H, 1.75. Found: C, 42.03; H, 1.99.

Example 64

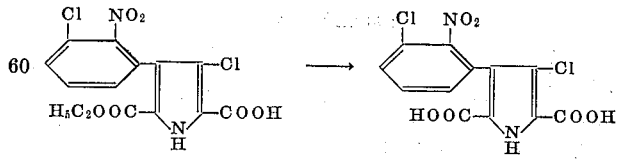

A mixture of 137 mg. of 2-ethoxycarbonyl-3-(2-nitro-3-chlorophenyl)-4-chloropyrrole-5-carboxylic acid, 100 mg. of potassium hydroxide and 6 cc. of water was heated under reflux for 3 hours. The condensed residue was diluted with water, acidified with 10% sulfuric acid under ice-cooling and extracted with ethyl acetate. The extract was washed with water and dried. The solvent was distilled off under reduced pressure and to this extract, a small amount of ethyl acetate was added to form crystals. The crystals were recrystallized from a mixture of ethyl acetate and ligroin to obtain 100 mg. of 3-(2-nitro- 3-chlorophenyl)-4-chloropyrrole-2,5-dicarboxylic acid as colorless needles, M.P. 298–299° C. (decomp.).

*Analysis.*—Calcd. for $C_{12}H_6O_6N_2Cl_2$: C, 41.76; H, 1.75; N, 8.11. Found: C, 42.28; H, 1.97; N, 8.06.

Example 65

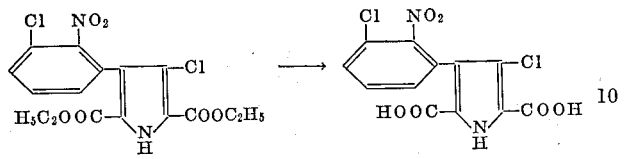

A solution of 1.0 g. of diethyl 3-(2-nitro-3-chlorophenyl)-4-chloropyrrole-2,5-dicarboxylate in 15 cc. of sodium hydroxide and 15 cc. of ethanol was heated under reflux for 4.5 hours. The reaction mixture was treated as described in Example 64 to obtain 900 mg. of 3-(2-nitro-3-chlorophenyl)-4-chloropyrrole-2,5-dicarboxylic acid.

Example 66

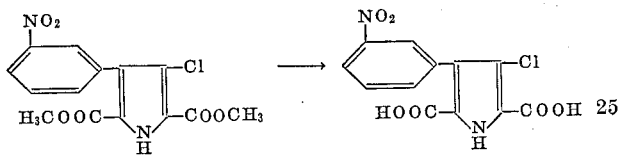

Dimethyl 3-(3-nitrophenyl)-4-chloropyrrole-2,5-dicarboxylate (285 mg.), together with 285 mg. of potassium hydroxide, 8 cc. of 95% ethanol and 24 cc. of water, was heated. After the reaction was completed, ethanol was distilled off under reduced pressure. The residue was added with water and then extracted with ethyl acetate. The extract was washed with water and then dried, and ethyl acetate was distilled off under reduced pressure. The residue was re-precipitated in a mixture of ethanol and water to obtain 148 mg. of 3-(3-nitrophenyl)-4-chloropyrrole-2,5-dicarboxylic acid as colorless crystals, M.P. 292–294° C. (decomp.).

Example 67

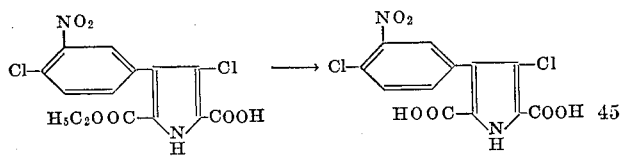

A mixture of 500 mg. of 2-ethoxycarbonyl-3-(3-nitro-4-chlorophenyl)-4-chloropyrrole-5-carboxylic acid, 15 cc. of 10% sodium hydroxide aqueous solution and 5 cc. of ethanol was heated under reflux for 4 hours. The reaction mixture was cooled, and then poured into 15 cc. of 10% sulfuric acid. The resultant solution was diluted with 50 cc. of water and extracted with ethyl acetate. The extract was dried and then concentrated to obtain 300 mg. of 3-(3-nitro-4-chlorophenyl)-4-chloropyrrole-2,5-dicarboxylic acid, M.P. 280° C. (decomp.).

Example 68

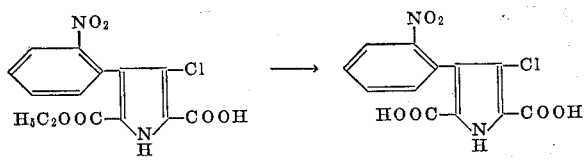

A mixture of 1.3 g. of 2-ethoxycarbonyl-3-(2-nitrophenyl)-4-chloropyrrole-5-carboxylic acid, 40 cc. of 10% sodium hydroxide aqueous solution and 15 cc. of ethanol was heated under reflux for 4 hours. The reaction mixture was cooled and then poured into 40 cc. of 10% sulfuric acid. The resultant solution was diluted with 130 cc. of water and extracted with ethyl acetate. The extract was dried and then concentrated to obtain 0.8 g. of 3-(2-nitrophenyl)-4-chloropyrrole-2,5-dicarboxylic acid, M.P. 275° C. (decomp.).

Example 69

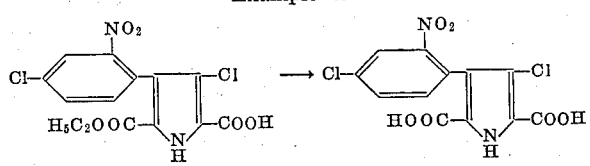

A mixture of 400 mg. of 2-ethoxycarbonyl-3-(2-nitro-4-chlorophenyl)-4-chloropyrrole-5-carboxylic acid, 12 cc. of 10% sodium hydroxide aqueous solution and 4 cc. of ethanol was heated under reflux for 4 hours. The reaction mixture was cooled and then poured into 12 cc. of 10% sulfuric acid. The resultant solution was diluted with 40 cc. of water and extracted with ethyl acetate. The extract was dried and then concentrated to obtain 200 mg. of 3-(2-nitro-4-chlorophenyl)-4-chloropyrrole-2,5-dicarboxylic acid.

Example 70

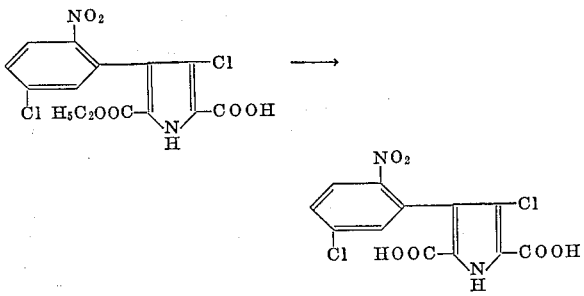

A mixture of 1.5 g. of 2-ethoxycarbonyl-3-(2-nitro-5-chlorophenyl)-4-chloropyrrole-5-carboxylic acid, 45 cc. of 10% sodium hydroxide aqueous solution and 15 cc. of ethanol was heated under reflux for 4 hours. The reaction mixture was cooled and then poured into 45 cc. of 10% sulfuric acid. The resultant solution was diluted with 150 cc. of water and extracted with ethyl acetate. The extract was dried and then concentrated to obtain 1.0 g. of 3-(2-nitro-5-chlorophenyl)-4-chloropyrrole-2,5-dicarboxylic acid, M.P. 303° C. (decomp.).

Example 71

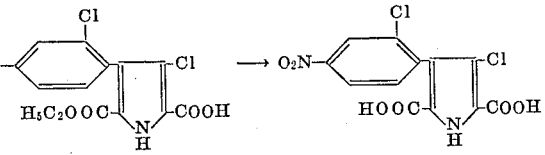

A mixture of 1.1 g. of 2-ethoxycarbonyl-3-(2-chloro-4-nitrophenyl)-4-chloropyrrole-5-carboxylic acid, 35 cc. of 10% sodium hydroxide aqueous solution and 10 cc. of ethanol was heated under reflux for 4 hours. The reaction mixture was cooled and then poured into 35 cc. of 10% sulfuric acid. The resultant solution was diluted with 110 cc. of water and extracted with ethyl acetate. The extract was dried and then concentrated to obtain 0.7 g. of 3-(2-chloro-4-nitrophenyl)-4-chloropyrrole-2,5-dicarboxylic acid, M.P. 252° C. (decomp.).

Example 72

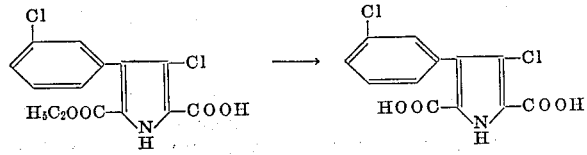

A mixture of 900 mg. of 2-ethoxycarbonyl-3-(3-chlorophenyl)-4-chloropyrrole-5-carboxylic acid, 25 cc. of 10% sodium hydroxide aqueous solution and 10 cc. of ethanol was heated under reflux for 4 hours. The reaction mixture was cooled and then poured into 25 cc. of 10% sulfuric acid. The resultant solution was diluted with 90 cc. of water and extracted with ethyl acetate. The extract was dried and then concentrated to obtain 500 mg. of 3-(3- chlorophenyl)-4-chloropyrrole - 2,5 - dicarboxylic acid, M.P. 254° C. (decomp.).

Example 73

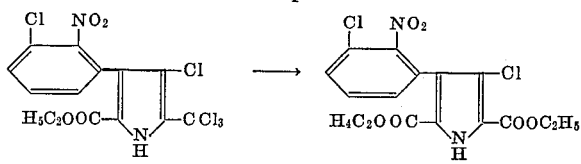

A mixture of ethyl 3-(2-nitro - 3 - chlorophenyl)-4-chloro-5-trichloromethylpyrrole - 2 - carboxylate, prepared by chlorination of 1.5 g. of ethyl 3-(2-nitro-3-chlorophenyl)-5-methylpyrrole-2-carboxylate, and 10 cc. of absolute ethanol was refluxed for 3 hours. Ethanol was distilled off under reduced pressure, and the residue was dissolved in ethyl acetate. The solution was washed with water, and then with sodium hydrogen carbonate solution, and then dried. After distillation of the solvent, the residue was recrystallized at first, from a benzene-ligroin mixture and then from ethanol to obtain 0.3 g. of diethyl 3-(2-nitro-3-chlorophenyl)-4-chloropyrrole - 2,5 - dicarboxylate as colorless fine needles, M.P. 137° C.

*Analysis.*—Calcd. for $C_{16}H_{14}O_6N_2Cl_2$: C, 47.90; H, 3.52; N, 6.98. Found: C, 48.02; H, 3.67; N, 6.93.

Example 74

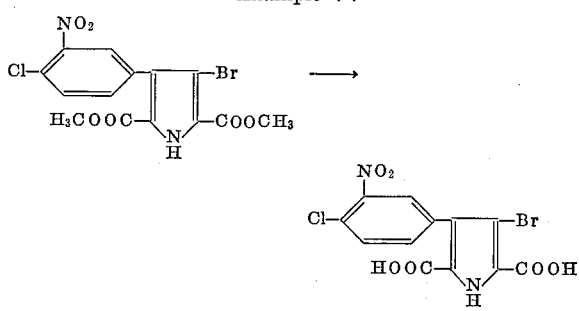

To a solution of 140 mg. of dimethyl 3-(3-nitro-4-chlorophenyl)-4-bromopyrrole-2,5-dicarboxylate in 5 cc. of 95% ethanol was added 100 mg. of potassium hydroxide in 4 cc. of water. The mixture was refluxed overnight. From the reaction mixture, ethanol was removed under reduced pressure. The residue was added with water, acidified with hydrochloric acid and then extracted with ethyl acetate. The extract was washed with water and dried. The solvent was distilled off and the residual crystals were recrystallized from an ethanol solution to obtain 113 mg. of 3-(3-nitro-4-chlorophenyl)-4-bromopyrrole-2,5-dicarboxylic acid as white crystals, M.P. 248° C. (decomp.).

*Analysis.* — Calcd. for $C_{12}H_6O_6N_2BrCl$: N, 7.19. Found: N, 7.43.

Example 75

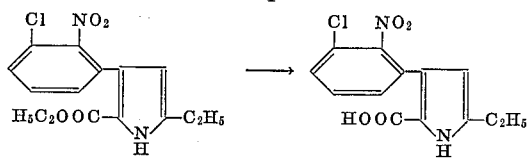

A mixture of 1.0 g. of ethyl 3-(2-nitro-3-chlorophenyl)-5-ethylpyrrole-2-carboxylate, 10 cc. of 10% sodium hydroxide aqueous solution and 10 cc. of ethanol was refluxed for 3 hours. After completion of the reaction, the reaction mixture was cooled and acidified with 10% sulfuric acid, and then 50 cc. of water added thereto. The solution was extracted with ethyl acetate. The extract was dried and the solvent was distilled off. The residue was recrystallized from a benzene-ethanol mixture to yield 550 mg. of 3-(2-nitro-3-chlorophenyl)-5-ethylpyrrole-2-carboxylic acid as colorless needles having a melting point of 182–183° C.

*Analysis.*—Calcd. for $C_{13}H_{11}O_4N_2Cl$: C, 52.98; H, 3.76; N, 9.51. Found: C, 52.74; H, 3.75; N, 9.28.

Example 76

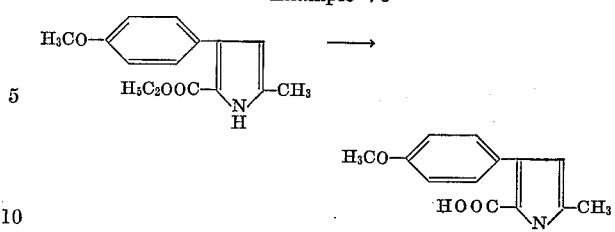

A mixture of ethyl 3-(4-methoxyphenyl)-5-methylpyrrole-2-carboxylate (0.7 g.), 10% sodium hydroxide (7 cc.) and 95% ethanol (4 cc.) was refluxed for 5 hours on a water bath. Ethanol was distilled off under reduced pressure. The resultant solution was diluted with water and extracted with ethyl ether. The ether extract was washed with water and dried, and then ether was distilled off. The residue was recrystallized from a benzene-ethanol mixture to yield 3 - (4 - methoxyphenyl)-5-methylpyrrole-2-carboxylic acid (0.3 g.) as colorless needles having a melting point of 152–154° C. (decomp.).

*Analysis.*—Calcd. for $C_{13}H_{13}O_3N$: C, 67.52; H, 5.67; N, 6.06. Found: C, 67.65; H, 5.88; N, 6.30.

Example 77

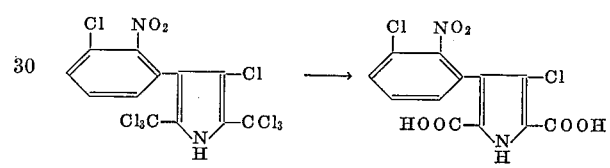

2,5-di(trichloromethyl) - 3 - (2-nitro-3-chlorophenyl)-4-chloropyrrole (400 mg.) was dissolved in 10 cc. of acetic acid and the solution was heated under reflux for one and a half hours. The resultant reaction mixture was poured into an ice-water (20 cc.) and extracted with ethyl acetate. The resulting extract was further extracted with 5% sodium hydroxide aqueous solution. The alkaline extract was acidified with 10% hydrochloric acid and then extracted with ethyl acetate. The resulting extract was dried and the solvent was distilled off to yield crude 3-(2 - nitro - 3 - chlorophenyl) - 4 - chloropyrrole-2,5-dicarboxylic acid (150 mg.). The crude product was recrystallized from a mixture of ethyl acetate and ligroin to obtain colorless needles, M.P. 298–299° C. (decomp.).

Example 78

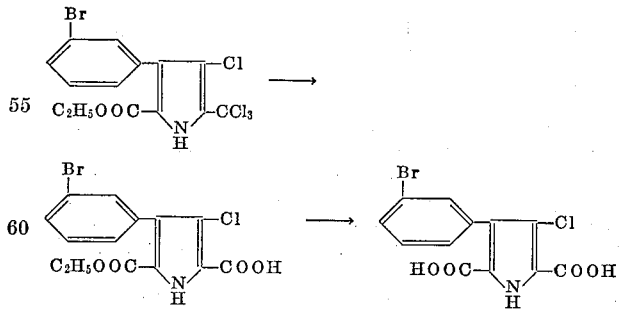

Ethyl 3 - (3 - bromophenyl) - 4 - chloro-5-trichloromethylpyrrole-2-carboxylate (1.4 g.) was dissolved in about 20 cc. of acetic acid. The solution was treated as described in Example 16 to obtain 2-ethoxycarbonyl-3-(3-bromophenyl)-4-chloropyrrole-5-carboxylic acid as colorless needles, M.P. 270° C.

*Analysis.*—Calcd. for $C_{14}H_{11}O_4NBrCl$: C, 45.13; H, 3.38; N, 3.76. Found: C, 44.93; H, 3.17; N, 3.91.

The compound thus obtained was then hydrolyzed with aqueous potassium hydroxide solution to yield 3-(3-bromophenyl-4-chloropyrrole-2,5-dicarboxylic acid.

Example 79

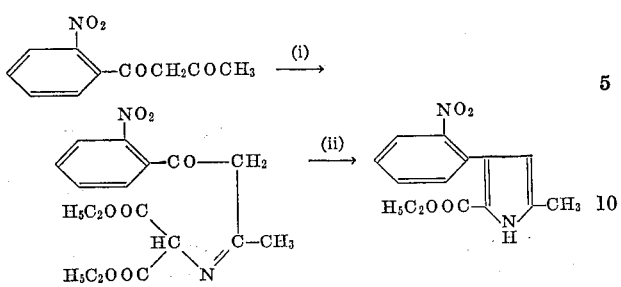

(i) A mixture of 4.0 g. of 1-(2-nitrophenyl)-1,3-butanedione, 4.5 g. of diethyl aminomalonate, 30 cc. of absolute ethyl alcohol and two drops of piperidine was refluxed for 5 hours. After completion of the reaction, ethyl alcohol was distilled off under reduced pressure. The residue was treated with ether and then the separated crystals were collected by filtration and then washed with ether and dried to obtain 4.3 g. of yellow crystals. The crystals were recrystallized from a mixed solvent of benzene and ether to obtain diethyl N-[1-methyl-3-(2-nitrophenyl)-3-oxopropylidene] aminomalonate as faint yellow granules having M.P. 85.5–87.5° C.

Analysis.—Calculated for $C_{17}H_{20}O_7N_2$: C, 56.04; H, 5.53; N, 7.69. Found: C, 56.01; H, 5.44; N, 7.75.

(ii) A solution of 0.5 g. of diethyl N-[1-methyl-3-(2-nitrophenyl)-3-oxopropylidene] aminomalonate in 2 cc. of absolute tetrahydrofuran was added dropwise with stirring to a solution of sodium ethoxide prepared from 6 cc. of absolute ethyl alcohol and 70 mg. of metallic sodium. After the reaction mixture was refluxed for 5 hours, the solvents were distilled off, under reduced pressure. The residue was added with water and the solution was extracted with ether. The ether extract was washed with water, dried over magnesium sulfate and then ether was distilled off to obtain an oily substance. This oily substance was treated with ether to obtain crystals. The crystals were recrystallized from 95% ethyl alcohol to obtain ethyl 3-(2-nitrophenyl-5-methylpyrrole-2-carboxylate as yellow crystals having M.P. 161.5–163° C.

Analysis.—Calculated for $C_{14}H_{14}O_4N_2$: C, 61.31; H, 5.15; N, 10.21. Found: C, 61.60; H, 5.46; N, 10.26.

Example 80

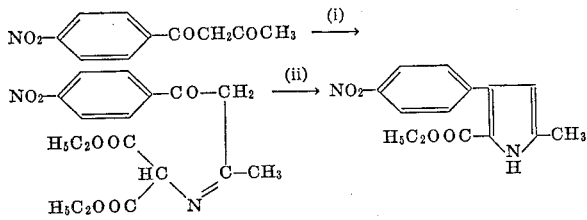

(i) A mixture of 30.0 g. of 1-(4-nitrophenyl)-1,3-butanedione, 30.4 g. of diethyl aminomalonate, 100 cc. of absolute benzene was refluxed for 10 hours. After completion of the reaction, benzene was distilled off under reduced pressure. The solid thus obtained was recrystallized from methanol to obtain 31.7 g. of diethyl N-[1-methyl-3-(4-nitrophenyl)-3-oxopropylidene] aminomalonate as yellow needles having M.P. 86–87° C.

Analysis.—Calculated for $C_{17}H_{20}O_7N_2$: C, 56.04; H, 5.53; N, 7.69. Found: C, 56.29; H, 5.74; N, 7.67.

(ii) A solution of 20.0 g. of diethyl N-[1-methyl-3-(4-nitrophenyl)-3-oxopropylidene] aminomalonate, 400 g. of ethyl polyphosphate and 800 cc. of absolute chloroform was refluxed for 18 hours. After completion of the reaction, chloroform was distilled off under reduced pressure. To the residue was added an ice-water to decompose ethyl polyphosphate and then the solution was extracted with ether. The extract was washed with aqueous sodium hydroxide, with water and then dried over anhydrous magnesium sulfate, after which ether was distilled off. The residue was submitted to silica-gel column chromatography with chloroform. The crystals obtained from the first fraction was recrystallized from ethanol to obtain 2.4 g. of ethyl 3-(4-nitrophenyl)-5-methylpyrrole-2-carboxylate as faint yellow scales having M.P. 189–191° C.

Analysis.—Calculated for $C_{14}H_{14}O_4N_2$: C, 61.30; H, 5.14; N, 10.22. Found: C, 61.36; H, 5.16; N, 10.27.

Example 81

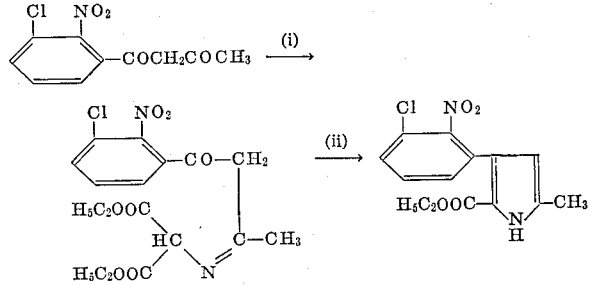

(i) A mixture of 2.0 g. of 1-(2-nitro-3-chlorophenyl)-1,3-butanedione, 1.9 g. of diethyl aminomalonate, 1.5 cc. of absolute ethyl alcohol and two drops of piperidine was refluxed for 5 hours. After cooling, the reaction mixture was allowed to stand and then crystals were separated. The crystals were collected by filtration and then dried to obtain 2.5 g. of colorless crystals. The crystals were recrystallized from a mixed solvent of benzene and ether to obtain diethyl N-[1-methyl-3-(2-nitro-3-chlorophenyl)-3-oxopropylidene] aminomalonate as colorless needles having M.P. 134–136° C.

Infra-red absorption spectrum:

$\nu CO = 1740, 1605$ (cm.$^{-1}$)
$\nu NO_2 = 1540, 1370$ (cm.$^{-1}$)

(ii) A solution of 0.8 g. of diethyl N-[1-methyl-3-(2-nitro-3-chlorophenyl)-3-oxopropylidene] aminomalonate in 4 cc. of absolute tetrahydrofuran was added dropwise with stirring to a solution prepared with 8 cc. of absolute ethanol and 100 mg. of metallic sodium. After the reaction mixture was refluxed for 4.5 hours, the solvents were distilled off under reduced pressure. The residue was added with an ice-water and the solution was extracted with ether. The extract was washed with water, dried over anhydrous magnesium sulfate, after which ether was distilled off. The residue was recrystallized from benzene to obtain ethyl 3-(2-nitro-3-chlorophenyl)-5-methylpyrrole-2-carboxylate as colorless needles having M.P. 220–223° C.

Analysis.—Calculated for $C_{14}H_{13}O_4N_2Cl$: C, 54.46; H, 4.24; N, 9.08. Found: C, 54.46; H, 4.19; N, 8.88.

Example 82

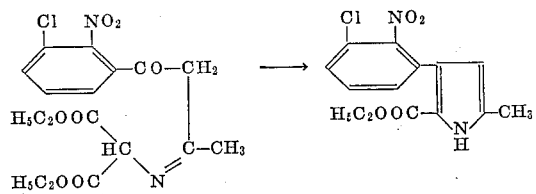

A mixture of 0.8 g. of diethyl N-[1-methyl-3-(2-nitro-3-chlorophenyl)-2-oxopropylidene] aminomalonate prepared in the same manner as described in the Example 81(i), 16.0 g. of ethyl polyphosphate and 20 cc. of chloroform was refluxed for 15 hours. After completion of the reaction, chloroform was distilled off under reduced pressure. To the residue was added an ice-water to decompose ethyl polyphosphate and then the solution was extracted with ether. The extract was washed with aqueous sodium hydroxide, with water and then dried over anhydrous magnesium sulfate, after which ether was distilled off. The residue was recrystallized from benzene to obtain 315 mg. of ethyl 3-(2-nitro-3-chlorophenyl)-5- methylpyrrole-2-carboxylate as colorless crystals having M.P. 222–223° C.

Example 83

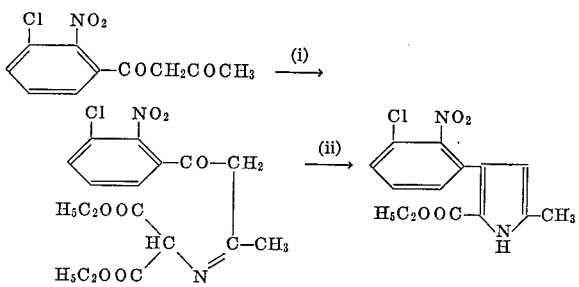

(i) A mixture of 2.0 g. of 1-(2-nitro-3-chlorophenyl)-1,3-butanedione, 1.8 g. of diethyl aminomalonate and 10 cc. of absolute benzene was refluxed for 10 hours in Dean Stark's dehydrating apparatus. After completion of the reaction, benzene was distilled off under reduced pressure. The residue was treated with ether and then crystals were separated. The crystals were collected by filtration, and then washed with ether and dried, after which the crystals were recrystallized from a mixed solvent of benzene and ligroin to obtain 2.86 g. of diethyl N - [1 - methyl-3-(2-nitro-3-chlorophenyl)-3-oxopropylidene] aminomalonate having M.P. 135–136° C.

*Analysis.*—Calculated for $C_{17}H_{19}O_7N_2Cl$: C, 51.20; H, 4.80; N, 7.02. Found: C, 51.24; H, 4.90, N, 7.07.

(ii) Diethyl N-[1-methyl-3-(2-nitro-3-chlorophenyl)-3-oxopropylidene] aminomalonate was treated in the same manner as described in the Example 82 to obtain ethyl 3 - (2 - nitro - 3 - chlorophenyl)-5-methylpyrrole-2-carboxylate having M.P. 222–223° C.

Example 84

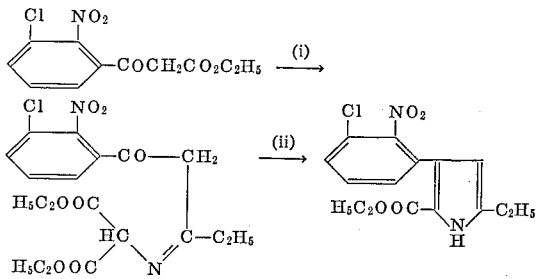

(i) A mixture of 4.5 g. of 1-(2-nitro-3-chlorophenyl)-1,3-pentanedione and 25 cc. of absolute benzene was refluxed for 10 hours in Dean Stark's dehydrating apparatus, after which the benzene was distilled off under reduced pressure to obtain 9.0 g. of brown solids. The solids were recrystallized from a mixed solvent of benzene and petroleum benzine to obtain diethyl N-[1-ethyl-3-(2-nitro-3-chlorophenyl)-3-oxopropylidene] aminomalonate having M.P. 86–87° C.

*Analysis.*—Calculated for $C_{18}H_{21}O_7N_2Cl$: C, 52.37; H, 5.13; N, 6.79; Cl, 8.59. Found: C, 52.55; H, 5.31; N, 6.59; Cl, 8.86.

(ii) A mixture of 7.4 g. of diethyl N[(1-ethyl-3-(2-nitro-3-chlorophenyl)-3-oxopropylidene] aminomalonate, 148 g. of ethyl polyphosphate and 148 cc. of absolute chloroform was refluxed for 16 hours. After completion of the reaction, chloroform was distilled off under reduced pressure. To the residue was added 200 cc. of ice-water to decompose ethyl polyphosphate and then solution was extracted with ether. The extract was washed three times with 5% aqueous sodium hydroxide, with water and then dried over anhydrous magnesium sulfate, after which ether was distilled off to obtain brown solids. The solids were recrystallized from methanol to obtain 2.3 g. of crude substance having M.P. 189–190° C., which was further recrystallized from methanol to obtain ethyl 3 - (2-nitro-3-chlorophenyl)-5-ethylpyrrole-2-carboxylate having M.P. 191–192° C.

*Analysis.*—Calculated for $C_{15}H_{15}O_4N_2Cl$: C, 55.81; H, 4.68; N, 8.68; Cl, 10.99. Found: C, 55.56, H, 4.89; N, 8.68; Cl, 11.08.

Example 85

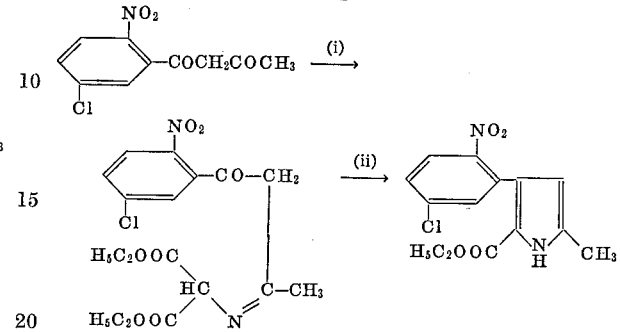

(i) A mixture of 20.0 g. of 1-(2-nitro-5-chlorophenyl)-1,3-butanedione, 18.0 g. of diethyl aminomalonate and 100 cc. of absolute benzene was refluxed for 10 hours in Dean Stark's dehydrating apparatus. After completion of the reaction, the reaction mixture was washed four times with 30 cc. of aqueous sodium hydroxide, washed twice with water and then dried over anhydrous magnesium sulfate, after which the solvent was distilled off to obtain 32.5 g. of diethyl N-[1-methyl-3-(2-nitro-5-chlorophenyl)-3-oxopropylidene] aminomalonate as oily substance.

Infra-red absorption spectrum:

$\nu C=O$: 1760, 1743, 1610 (cm.$^{-1}$)
$\nu NO_2$: 1345 (cm.$^{-1}$).

(ii) A mixture of 17.8 g. of diethyl N-[1-methyl-3-(2-nitro-5-chlorophenyl)-3-oxopropylidene] aminomalonate, 17.8 g. of ethyl polyphosphate and 900 cc. of absolute chloroform was refluxed for 48 hours. After completion of the reaction, chloroform was distilled off. To the residue was added an ice-water to decompose ethyl polyphosphate and then the solution was extracted with ether. The extract was washed with aqueous sodium hydroxide, water and then dried, after which ether was distilled off. The residue was submitted to column chromatography and eluted with benzene. The crystals obtained from the first fraction were recrystallized from ethanol to obtain 6.1 g. of ethyl 3-(2-nitro-5-chlorophenyl)-5-methylpyrrole-2-carboxylate as pale yellow needles having M.P. 155–156° C.

*Analysis.*—Calculated for $C_{14}H_{13}N_2O_4Cl$: C, 54.47; H, 4.25; N, 9.08. Found: C, 54.36; H, 4.62; N, 9.30.

Example 86

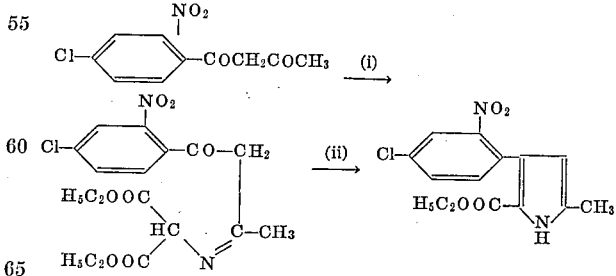

(i) 1 - (2 - nitro - 4 - chlorophenyl) - 1,3 - butanedione (1.2 g.), 1.1 g. of diethyl aminomalonate and 10 cc. of absolute benzene were treated in the same manner as described in the Example 85(i), after which the product was recrystallized from a mixed solvent of benzene and ligroin to obtain 1.2 g. of diethyl N-[1-methyl-3-(2-nitro-4-chlorophenyl)-3-oxopropylidene] aminomalonate as yellow needles having M.P. 110–111.5° C.

*Analysis.*—Calculated for $C_{17}H_{19}O_7N_2Cl$: C, 51.20; H, 4.80; N, 7.02. Found: C, 51.49; H, 4.85; N, 6.99.

(ii) A mixture of 0.7 g. of diethyl N-[1-methyl-3-(2-nitro-4-chlorophenyl)-3-oxopropylidene] aminomalonate, 15.0 g. of ethyl polyphosphate and 40 cc. of chloroform was treated in the same manner as described in the Example 82 to obtain 100 mg. of ethyl 3-(2-nitro-4-chlorophenyl)-5-methylpyrrole-2-carboxylate having M.P. 156–157° C.

Analysis.—Calculated for $C_{14}H_{13}N_2O_4Cl$: C, 54.47; H, 4.24; N, 9.08. Found: C, 54.53; H, 4.28; N, 9.28

Example 87

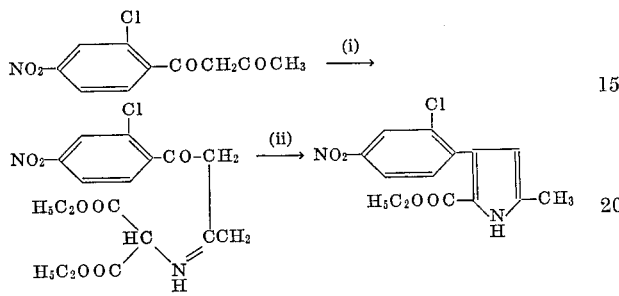

(i) A mixture of 20.0 g. of 1-(2-chloro-4-nitrophenyl)-1,3-butanedione, 18.0 g. of diethyl aminomalonate and 100 cc. of absolute benzene was treated in the same manner as described in the Example 85(i), after which the product was recrystallized from 99% ethanol to obtain 29.5 g. of diethyl N-[1-methyl-3-(2-chloro-4-nitrophenyl)-3-oxopropylidene] aminomalonate as yellow crystals having M.P. 78–79° C.

Analysis.—Calculated for $C_{17}H_{19}O_7N_2Cl$: C, 51.20; H, 4.80; N, 7.02; Cl, 8.89. Found: C, 51.21; H, 4.98; N, 7.07; Cl, 9.12.

(ii) A mixture of 14.0 g. of diethyl N-[1-methyl-3-(2-chloro-4-nitrophenyl)-3-oxopropylidene] aminomalonate, 280 g. of ethyl polyphosphate and 700 cc. of absolute chloroform was refluxed for 45 hours. After completion of the reaction, the reaction mixture was treated in the same manner as described in the Example 85(ii) to obtain 5.2 g. of ethyl 3-(2-chloro-4-nitrophenyl)-5-methylpyrrole-2-carboxylate as crude crystals.

The crystals were recrystallized from ethanol to obtain ethyl 3-(2-chloro-4-nitrophenyl)-5-methylpyrrole-2-carboxylate having M.P. 202–203° C. (dec.).

Analysis.—Calculated for $C_{14}H_{13}O_4N_2Cl$: C, 54.47; H, 4.24; N, 9.07; Cl, 11.48. Found: C, 54.48; H, 4.49; N, 8.93; Cl, 11.42.

Example 88

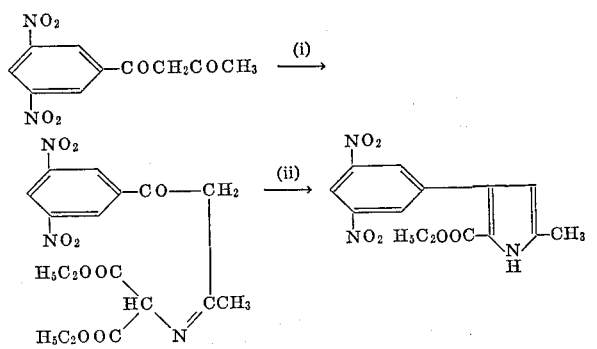

(i) A mixture of 8.0 g. of 1-(3,5-dinitrophenyl)-1,3-butanedione, 5.6 g. of diethyl aminomalonate and 50 cc. of absolute benzene was refluxed for 10 hours in the reaction vessel equipped with the dehydrating apparatus. After completion of the reaction, the reaction mixture was treated in the same manner as described in the Example 85(i) to obtain 9.5 g. of crude product. The product was recrystallized from benzene to obtain diethyl N-[1-methyl-3-(3,5-dinitrophenyl)-3-oxopropylidene] aminomalonate as yellow needles having M.P. 163.5–165.5° C.

Analysis.—Calculated for $C_{17}H_{19}O_9N_3$: C, 49.88; H, 4.68; N, 10.27. Found: C, 49.86; H, 4.96; N, 10.05.

(ii) A mixture of 8.0 g. of diethyl N-[1-methyl-3-(3,5-dinitrophenyl)-3-oxopropylidene] aminomalonate, 120 g. of ethyl polyphosphate and 160 cc. of absolute chloroform was treated in the same manner as described in the Example 82, after which the product was recrystallized from acetone to obtain 1.8 g. of ethyl 3-(3,5-dinitrophenyl)-5-methylpyrrole-2-carboxylate as yellow crystals having M.P. 211–212° C.

Analysis.—Calculated for $C_{14}H_{13}O_6N_3$: C, 52.66; H, 4.10; N, 13.16. Found: C, 52.84; H, 4.35; N, 13.37.

Example 89

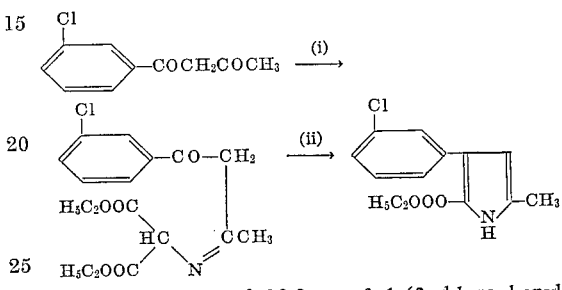

(i) A mixture of 20.0 g. of 1-(3-chlorophenyl)-1,3-butanedione, 18.0 g. of diethyl aminomalonate and 100 cc. of absolute benzene was treated in the same manner as described in the Example 85(i), after which the product was recrystallized from a mixed solvent of ether and n-hexane to obtain diethyl N-[1-methyl-3-(3-chlorophenyl)-3-oxopropylidene] aminomalonate as colorless needles having M.P. 54–56° C.

Analysis.—Calculated for $C_{17}H_{20}O_5NCl$: C, 57.71; H, 5.69; N, 3.96. Found: C, 57.93; H, 5.72; N, 4.17.

(ii) A solution of 9.5 g. of diethyl N-[1-methyl-3-(3-chlorophenyl)-3-oxopropylidene] aminomalonate in 38 cc. of absolute tetrahydrofuran was added dropwise with stirring to a solution of sodium ethoxide prepared from 130 cc. of absolute ethanol and 1.33 g. of metallic sodium. Hereafter the reaction mixture was treated in the same manner as described in the Example 81(ii) to obtain 4.25 g. of crude crystals. The crystals were recrystallized from a mixed solvent of benzene and n-hexane to obtain ethyl 3-(3-chlorophenyl)-5-methylpyrrole-2-carboxylate having M.P. 154–155° C.

Analysis.—Calculated for $C_{14}H_{14}O_2NCl$: C, 63.76; H, 5.36; N, 5.32. Found: C, 63.99; H, 5.50; N, 5.47.

Example 90

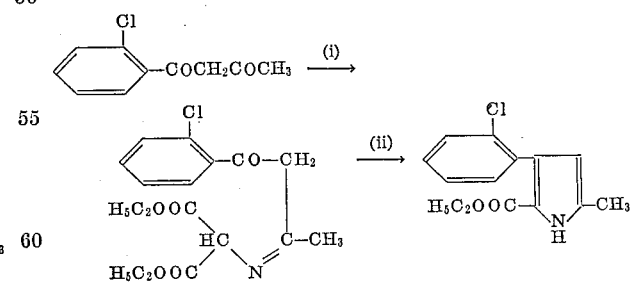

(i) A mixture of 20.0 g. of 1-(2-chlorophenyl)-1,3-butandione, 21.4 g. of diethyl aminomlonate and 100 cc. of absolute benzene was treated in the same manner as described in the Example 85(i) to obtain 38.0 g. of crude diethyl N-[1-methyl-3-(2-chlorophenyl)-3-oxopropylidene] aminomalonate. This product was recrystallized from methanol to obtain diethyl N-[1-methyl-3-(2-chlorophenyl)-3-oxopropylidene] aminomalonate having M.P. 61–63° C.

Analysis.—Calculated for $C_{17}H_{20}O_5NCl$: C, 57.71; H, 5.70; N, 3.96. Found: C, 57.69; H, 5.67; N, 3.97.

(ii) A mixture of 15.0 g. of diethyl N-[1-methyl-3-(2-chlorophenyl)-3-oxopropylidene] aminomalonate, 300 g.

of ethyl polyphosphate and 600 cc. of absolute chloroform was refluxed for 18 hours. After completion of the reaction, the reaction mixture was treated in the same manner as described in the Example 85(ii) to obtain 4.0 g. of ethyl 3-(2-chlorophenyl)-5-methylpyrrole-2-carboxylate having M.P. 141–142° C.

*Analysis.*—Calculated for $C_{14}H_{14}O_2NCl$: C, 63.76; H, 5.35; N, 5.31. Found: C, 63.56; H, 5.65; N, 5.43.

Example 91

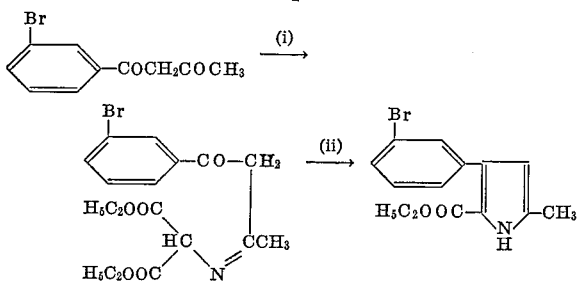

(i) A mixture of 17.2 g. of 1-(3-bromophenyl)-1,3-butanedione, 15.3 g. of diethyl aminomalonate and 70 cc. of absolute benzene was refluxed for 10 hours in Dean Stark's dehydrating appartus, after which the reaction mixture was treated in the same manner as described in the Example 85(i). The product thus obtained was recrystallized from a mixed solvent of benzene and petroleum ether to obtain 2.0 g. of diethyl N-[1-methyl-3-(3-bromophenyl)-3-oxopropylidene] aminomalonate as faint yellow needles having M.P. 54–55° C.

*Analysis.*—Calculated for $C_{17}H_{20}O_5NBr$: C, 51.26; H, 5.03; N, 3.52. Found: C, 51.17; H, 5.23; N, 3.63.

(ii) A solution of 7.4 g. of diethyl N-[1-methyl-3-(3-bromophenyl)-3-oxopropylidene] aminomalonate in 30 cc. of absolute ethanol was added to a solution of sodium ethoxide prepared from 90 cc. of absolute ethanol and 1.0 g. of metallic sodium. The mixture was refluxed for 5 hours, after which the solvent was distilled off under reduced pressure. The residue was added with an ice-water and then crystals were separated.

The crystals were collected by filtration and dried, after which the crystals were dissolved into benzene and the solution was filtered to remove impurities. The filtrate was condensed under reduced pressure to obtain crude crystals, which were recrystallized from ethanol to obtain 1.6 g. of ethyl 3-(3-bromophenyl)-5-methylpyrrole-2-carboxylate as colorless plates having M.P. 160–161° C.

*Analysis.*—Calculated for $C_{14}H_{14}O_2NBr$: C, 54.56; H, 4.58; N, 4.55. Found: C, 54.27; H, 4.56; N, 5.07.

Example 92

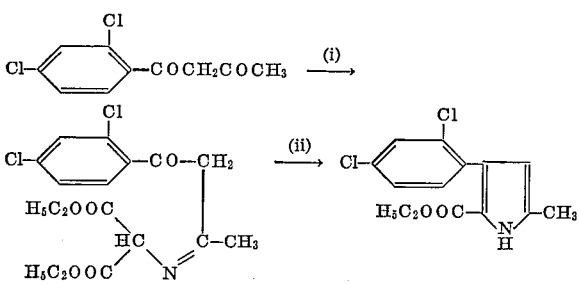

(i) A mixture of 7.0 g. of 1-(2,4-dichlorophenyl)-1,3-butanedione, 6.0 g. of diethyl aminomalonate and 35 cc. of absolute benzene was refluxed for 10 hours, after which the reaction mixture was treated in the same manner as described in the Example 83(i). The product thus obtained was recrystallized from a mixed solvent of benzene and petroleum benzine to obtain 5.0 g. of diethyl N - [1-methyl-3-(2,4-dichlorophenyl)-3-oxopropylidene]-3 aminomalonate as oily substance.

(ii) A solution of 4.0 g. of diethyl N-[1-methyl-3-(2,4-dichlorophenyl)-3-oxopropylidene] aminomalonate in 15 cc. of absolute ethanol was added to a solution of sodium ethoxide prepared from 52 cc. of absolute ethanol and 0.52 g. of metallic sodium. The mixture was refluxed for 5 hours, after which the reaction mixture was treated in the same manner as described in the Example 81(ii). The product thus obtained was developed over thin layer chromatography of silica-gel with benzene. Then, the second fraction which fluoresced under radiation of ultra-violet rays was collected and extracted with chloroform, after which chloroform was distilled off under reduced pressure. The residue was recrystallized from ethanol to obtain 0.4 g. of ethyl 3-(2,4-dichlorophenyl)-5-methylpyrrole-2-carboxylate as colorless scales having M.P. 193° C.

*Analysis.*—Calculated for $C_{14}H_{13}O_2NCl_2$: C, 56.39; H, 4.40; N, 4.70; Cl, 23.78. Found: C, 56.35; H, 4.45; N, 4.61; Cl, 23.57.

Example 93

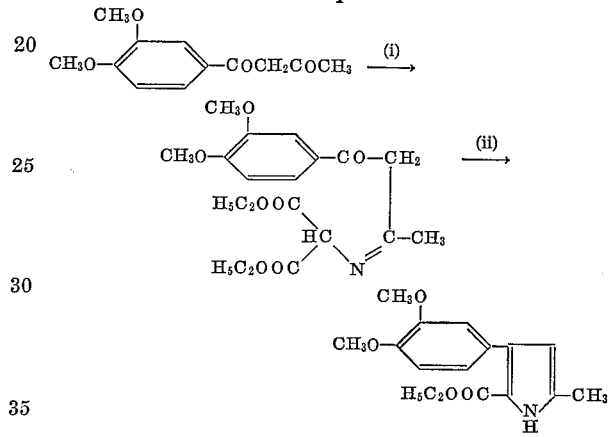

(i) A mixture of 23.0 g. of 1-(3,4-dimethoxyphenyl)-1,3-butanedione, 21.8 g. of diethyl aminomalonate and 350 cc. of absolute benzene was refluxed for about 10 hours in Dean Stark's dehydrating apparatus. After completion of the reaction, benzene was distilled off to obtain yellow oily substance, which was cooled and then crystallized. The crystals thus obtained were recrystallized from aqueous ethanol to obtain 21.0 g. of diethyl N-[1-methyl-3 - (3,4 - dimethoxyphenyl)-3-oxopropylidene] aminomalonate having M.P. 101–102° C.

*Analysis.*—Calculated for $C_{19}H_{25}NO_7$: C, 60.15; H, 6.64; N, 3.69. Found: C, 59.88; H, 6.82; N, 3.84.

(ii) A mixture of 21.0 g. of diethyl N-[1-methyl-3-(3,4 - dimethoxyphenyl)-3-oxopropylidene] aminomalonate, 400 g. of ethyl polyphosphate and 800 cc. of absolute chloroform was refluxed for about 15 hours under reduced pressure. After completion of the reaction, chloroform was distilled off. To the residue was added an ice-water to decompose ethyl polyphosphate and then the solution was extracted with chloroform. The extract was washed with 5% aqueous sodium hydroxide, with water and then dried over anhydrous magnesium sulfate, after which chloroform distilled off to obtain 11.0 g. of the residue. The residue was treated as described in the Example 85(ii) to obtain crude product, which was recrystallized from 95% ethanol to obtain ethyl 3-(3-,4-dimethoxyphenyl) - 5-methylpyrrole-2-carboxylate having M.P. 122–123° C.

*Analysis.*—Calculated for $C_{16}H_{19}NO_4$: C, 66.42; H, 6.42; N, 4.84. Found: C, 66.12; H, 6.60; N, 4.87.

Example 94

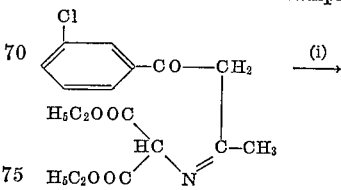

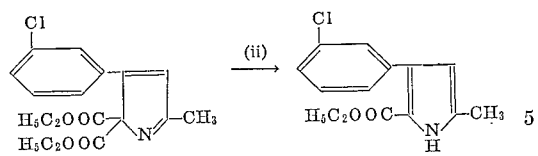

(i) A mixture of 1.0 g. of diethyl N-[1-methyl-3-(3-chlorophenyl) - 3-oxopropylidene] aminomalonate obtained in the Example 89(i), 20.0 g. of ethyl polyphosphate and 20 cc. of absolute chloroform was refluxed for 17 hours. After completion of the reaction, chloroform was distilled off under reduced pressure. To the residue was added an ice-water to decompose ethyl polyphosphate and then the solution was extracted with ether. The extract was washed with aqueous sodium hydroxide, water and then dried over anhydrous magnesium sulfate, after which ether was distilled off to obtain 0.7 g. of crude product. The product was recrystallized from a mixed solvent of ether and n-hexane to obtain diethyl 3-(3-chlorophenyl) - 5 - methyl-2H-pyrrole-2,2-dicarboxylate as colorless crystals having M.P. 79–80° C.

*Analysis.*—Calculated for $C_{17}H_{18}O_4NCl$: C, 60.80; H, 5.41; N, 4.17; Cl, 10.56. Found: C, 61.20; H, 5.50; N, 4.22; Cl, 10.70.

(ii) A solution of 500 mg. of diethyl 3-(3-chlorophenyl-5-methyl-2H-pyrrole-2,2-dicarboxylate in 3 cc. of absolute tetrahydrofuran was added dropwise to a solution of sodium ethoxide prepared from 40 mg. of metallic sodium and 5 cc. of absolute ethanol and then the mixture was refluxed for 3 hours. After completion of the reaction, the solvents were distilled off under reduced pressure. The residue was added with ice-water and the solution was extracted with ether to obtain 400 mg. of crude crystals. The crystals were recrystallized from a mixed solvent of benzene and n-hexane to obtain ethyl 3 - (3 - chlorophenyl)-5-methylpyrrole-2-carboxylate as colorless scales having M.P. 154–155° C.

Example 95

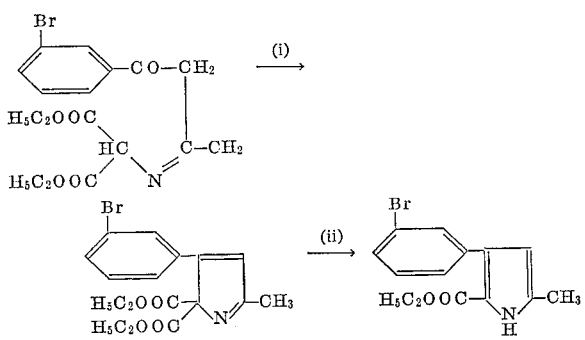

(i) A mixture of 2.0 g. of diethyl N-[1-methyl-3-(3-bromophenyl-3-oxopropylidene] aminomalonate obtained in the Example 91(i), 40.0 g. of ethyl polyphosphate and 40 cc. of absolute chloroform was refluxed for 15 hours, after which the reaction mixture was treated in the same manner as described in the Example 94(i).

The product thus obtained was recrystallized from a mixed solvent of ether and n-hexane to obtain 1.1 g. of diethyl 3 - (3 - bromophenyl)-5-methyl-2H-pyrrole-2,2-dicarboxylate as colorless needles having M.P. 77.5–78° C.

*Analysis.*—Calculated for $C_{17}H_{18}O_4NBr$: C, 53.70; H, 4.77; N, 3.68. Found: C, 53.69; H, 4.85; N, 3.50.

(ii) A solution of 100 mg. of diethyl 3-(3-bromophenyl) - 5 - methyl-2H-pyrrole-2,2-dicarboxylate in 2 cc. of absolute ethanol was added dropwise to a solution of sodium ethoxide prepared from 9 mg. of metallic sodium and 3 cc. of absolute ethanol and then the mixture was refluxed for 3 hours. After cooling, the solvent was distilled off under reduced pressure to obtain solids. To this solids, an ice-water was added, and then insoluble substance was collected by filtration and washed with water. This substance was recrystallized from 95% ethanol to obtain 650 mg. of ethyl 3-(3-bromophenyl)-5-methylpyrrole-2-carboxylate as colorless plates having M.P. 160–161° C.

Example 96

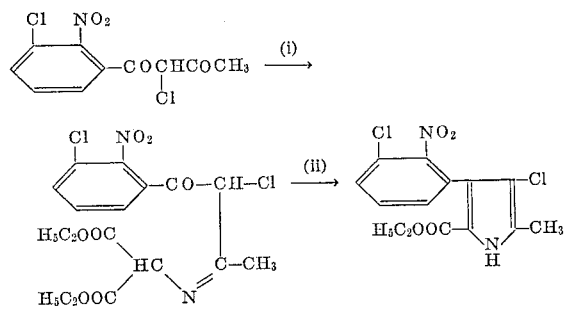

(i) A mixture of 2.0 g. of 1-(2-nitro-3-chlorophenyl)-2-chloro-1,3-butanedione [1], 1.5 g. of diethyl aminomalonate and 20 cc. of absolute benzene was refluxed for 10 hours. After completion of the reaction, the solvent was distilled off under reduced pressure. The residue was added with ether and then crystals were separated. The crystals were collected by filtration, and then recrystallized from a mixed solvent of benzene and petroleum benzine to obtain 2.3 g. of diethyl N-[1-methyl-2-chloro-3-(2-nitro-3-chlorophenyl)-3-oxopropylidene] aminomalonate having M.P. 107–108.5° C.

*Analysis.*—Calculated for $C_{17}H_{18}O_7N_2Cl_2$: C, 47.13; H, 4.19; N, 6.47; Cl, 16.37. Found: C, 47.00; H, 4.31; N, 6.20; Cl, 16.23.

(ii) A mixture of 1.0 g. of diethyl N-[1-methyl-2-chloro - 3-(2-nitro-3-chlorophenyl) - 3-oxopropylidene] aminomalonate, 15.0 g. of ethyl polyphosphate and 20 cc. of chloroform was refluxed for 19 hours.

After completion of the reaction, the reaction mixture was treated in the same manner as described in the Example 82. The product thus obtained was recrystallized from benzene to obtain 205 mg. of ethyl 3-(2-nitro-3 chlorophenyl)-4-chloro - 5-methylpyrrole - 2-carboxylate, M.P. 248.5–249.5° C.

*Analysis.*—Calculated for $C_{14}H_{12}O_4N_2Cl_2$: C, 48.99; H, 3.53; N, 8.16; Cl, 20.66. Found: C, 49.16; H, 3.68; N, 8.31; Cl. 20.52.

Example 97

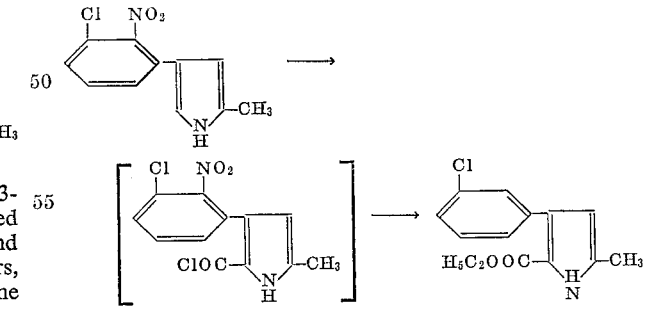

3-(2-nitro-3-chlorophenyl)-5-methylpyrrole (476 mg.) and 242 mg. of dimethylaniline were dissolved into 20 cc. of absolute benzene. Excess phosgene was passed into the above mixture at room temperature with stirring, after which the mixture was refluxed for 1.5 hours to obtain a solution of 3-(2-nitro-3-chlorophenyl)-5-methylpyrrole-2-carbonyl chloride.

To this solution of 3-(2-nitro-3-chlorophenyl)-5-methylpyrrole-2-carbonyl chloride thus obtained, 242 mg. of dimethylaniline and about 1 g. of absolute ethanol were

---

[1] 1-(2-nitro-3-chlorophenyl)-2-chloro-1,3 - butanedione was prepared from 1-(2-nitro-3-chlorophenyl)-1,3-butanedione and sulfuryl chloride. Melting point: 76–78° C.
*Analysis.*—Calculated for $C_{10}H_7O_4Cl_2$: C, 43.50; H, 2.56; N, 5.08; Cl, 25.68. Found: C, 43.80; H, 2.52; N, 5.25; Cl. 25.42.

added and the mixture was allowed to stand for 30 minutes. Then, dried air was passed through the reaction mixture to remove phosgene, after which benzene was distilled off under reduced pressure. The residue was added with 1% hydrochloric acid and the solution was extracted with ethyl acetate. The extract was washed with 1% hydrochloric acid, with water, dried over anhydrous magnesium sulfate and decolorized, after which the solvent was distilled off and then needle-like crystals were separated. The crystals were washed with a little amount of cooled benzene and then recrystallized from benzene to obtain 360 mg. of ethyl 3-(2-nitro-3-chlorophenyl)-5-methylpyrrole-2-carboxylate having M.P. 222–223° C.

*Analysis.*—Calculated for $C_{14}H_{13}O_4N_2Cl$: C, 54.46; H, 4.24; N, 9.08. Found: C, 54.61; H, 4.37; N, 9.07.

Example 98

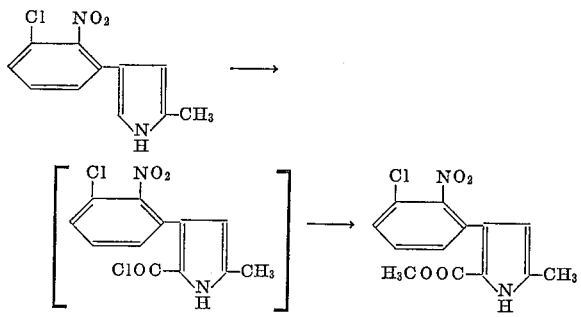

3-(2-nitro - 3-chlorophenyl) - 5-methylpyrrole (2.0 g.) and 1.0 g. of dimethylaniline were dissolved into 25 cc. of absolute benzene. To this solution, a solution of 3.8 g. of phosgene in 30 cc. of absolute benzene was added dropwise with stirring, after which the mixture was refluxed for an hour. To the cooled reaction mixture, a mixed solution of 17 cc. of absolute methanol and 1.0 g. of dimethylaniline was added dropwise, after which the mixture was stirred at room temperature for an hour. The reaction mixture was passed into with dried air to remove excess phosgene away and then allowed to stand overnight. The separated crystals were collected by filtration. On the other hand the filtrate was washed with 5% aqueous solution of sodium hydroxide, dried and condensed, and then crystals were separated. These crystals were put together and recrystallized from benzene to obtain 2.0 g. of methyl 3-(2-nitro - 3-chlorophenyl)-5-methyl-pyrrole - 2-carboxylate as colorless needles having M.P. 198–199° C.

*Analysis.*—Calculated for $C_{13}H_{11}O_4N_2Cl$: C, 52.98; H, 3.76; N, 9.51; Cl, 12.03. Found: C, 52.78; H, 3.88; N, 9.36; Cl, 12.18.

Example 99

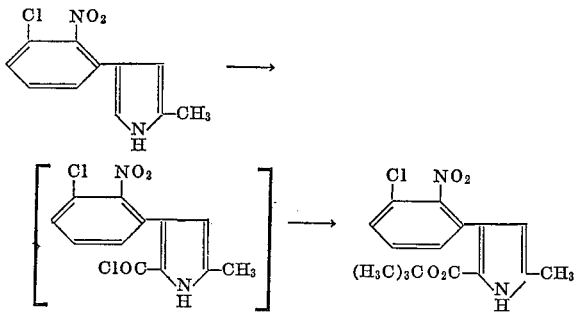

3-(2-nitro - 3-chlorophenyl) - 5-methylpyrrole (4.8 g.) and 2.4 g. of dimethylaniline were dissolved into 200 cc. of benzene, and then the mixture was treated in the same manner as described in the Example 98. The solution of 3-(2-nitro-3-chlorophenyl) - 5-methylpyrrole - 2-carbonyl chloride thus obtained was treated with 2.4 g. of dimethyl-aniline and 15 g. of tert.-butanol in the same manner as described in the Example 98.

The product was recrystallized from benzene to obtain t-butyl 3-(2-nitro-3-chlorophenyl)- - 5-methyl-pyrrole-2-carboxylate as colorless needles having M.P. 224–225° C.

*Analysis.*—Calculated for $C_{16}H_{17}O_4N_2Cl$: C, 57.06; H, 5.09; N, 8.32; Cl, 10.53. Found: C, 56.98; H, 5.16; N, 8.32; Cl, 10.62.

Example 100

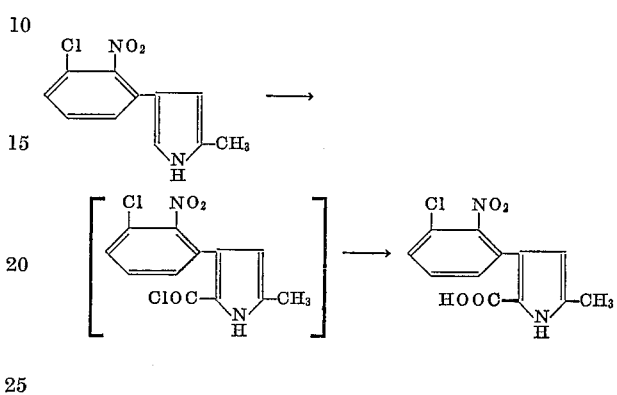

3-(2-nitro-3-chlorophenyl)-5-methylpyrrole (476 mg.) and 242 mg. of dimethylaniline were reacted with phosgene in the same manner as described in the Example 97. To the solution of 3-(2-nitro-3-chlorophenyl)-5-methyl-pyrrole-2-carbonyl chloride thus obtained, 20 cc. of an aqueous solution of 5% potassium carbonate was added dropwise under cooling with stirring. The mixture was stirred for an hour under cooling and then water layer was separated. The water layer was acidified with 10% sulfuric acid under cooling and then extracted with ethyl acetate. The extract was washed with water, dried over anhydrous magnesium sulfate and decolorized, after which the solvent was distilled off under reduced pressure. The residue was recrystallized from a mixed solvent of ethyl acetate and ligroin to obtain 300 mg. of 3-(2-nitro-3-chlorophenyl)-5-methylpyyrole-2-carboxylic acid as colorless needles having M.P. 211° C. (dec.).

*Analysis.*—Calculated for $C_{12}H_9O_4N_2Cl$: C, 51.35; H, 3.23; N, 9.98. Found: C, 51.57; H, 3.39; N, 9.64.

Example 101

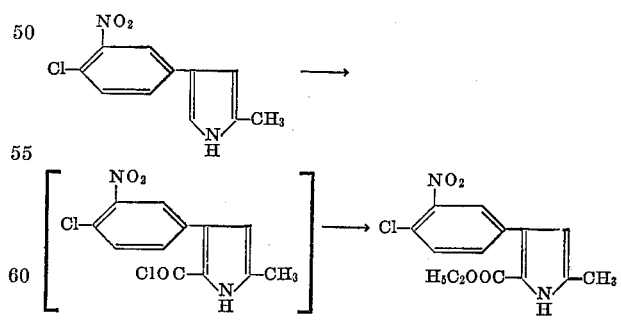

3-(3-nitro-4-chlorophenyl)-5-methylpyrrol (476 mg.) and 242 mg. of dimethylaniline were reacted with phosgene in the same manner as described in the Example 97. The solution of 3-(3-nitro-4-chlorophenyl)-5-methyl-pyrrole-2-carbonyl chloride thus obtained was treated with 242 mg. of dimethylaniline and 1 g. of ethanol in the same manner as described in the Example 97 to obtain 300 mg. of ethyl 3-(3-nitro-4-chlorophenyl)-5-methyl-pyrrole-2-carboxylate having M.P. 167° C.

*Analysis.*—Calculated for $C_{14}H_{13}O_4N_2Cl$: C, 54.46; H, 4.24; N, 9.08. Found: C, 54.58; H, 4.36; N, 8.99.

Example 102

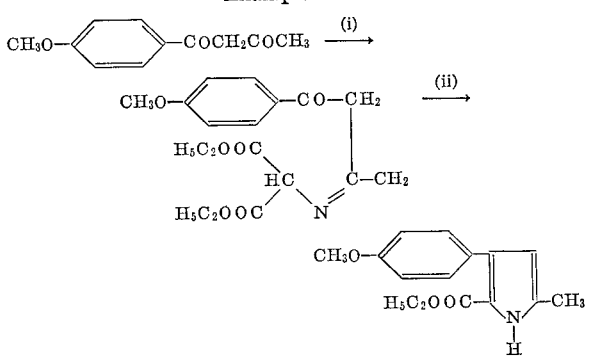

(i) A solution of 39 g. of 1-(4-methoxyphenyl)-1,3-butadione and 4.3 g. of diethyl aminomalonate in 20 cc. of anhydrous benzene was refluxed for 10 hrs. in Dean Stark's dehydrating apparatus. After completing the reaction, the solvent was distilled off to obtain 6.6 g. of diethyl N-[1-methyl-3-(4-methoxyphenyl)-3-oxopropylidene] aminomalonate as red oily substance.

After standing in the oily substance, the resulting solid was recrystallized from aqueous ethanol to obtain faint yellow crystals, M.P. 70–71° C.

*Analysis.*—Calculated for $C_{18}H_{23}NO_5$: C, 61.88; H, 6.64; N, 4.01. Found: C, 61.58; H, 6.76; N, 3.88.

(ii) Diethyl N-[1-methyl-3-(4-methoxyphenyl)-3-oxopropylidene] aminomalonate (6.0 g.), 100 g. of ethyl polyphosphate and 120 cc. of chloroform were refluxed for 15 hrs. After completing the reaction, chloroform was distilled off and the residue was added with ice-water to decompose ethyl polyphosphate. The mixture was extracted with ether and the extract solution was washed with 5% aqueous sodium hydroxide solution and then with water. After drying, ether was distilled off from the extract solution and the residue was submitted to the column chromatography with benzene as a solvent. The crystals obtained from the first fraction was recrystallized from ethanol to obtain 1.2 g. of ethyl 2-methyl-4-(4-methoxyphenyl)pyrrole-5-carboxylate, M.P. 130° C. as faint yellow crystals.

*Analysis.*—Calculated for $C_{15}H_{17}NO_3$: C, 69.48; H, 6.61; N, 5.40. Found: C, 69.49; H, 6.64; N, 5.21.

Example 103

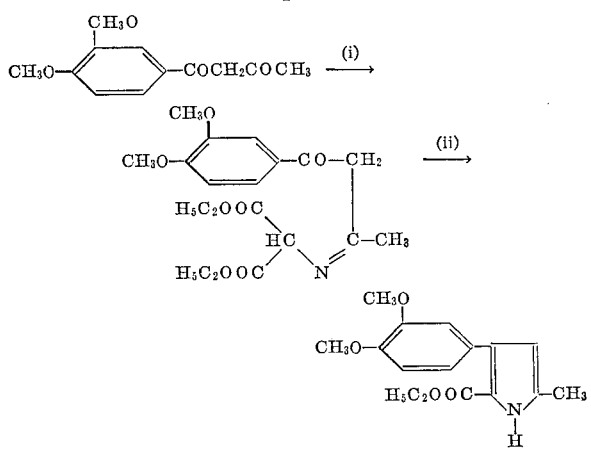

(i) A solution of 23.0 g. of 1-(3,4-dimethoxyphenyl)-1,3-butadione and 21.8 g. of diethylaminomalonate in 350 cc. of anhydrous benzene was refluxed for 10 hrs. under stirring. After completing the reaction, the solvent was distilled off and the residue was recrystallized from aqueous ethanol to obtain 21.0 g. of diethyl N-[1-methyl-3-(3,4-dimethoxyphenyl-3-oxopropylidene] aminomalonate, M.P. 101–102° C.

*Analysis.*—Calculated for $C_{19}H_{25}NO_7$: C, 60.15; H, 6.64; N, 3.69. Found: C, 59.88; H, 6.82; N, 3.84.

(ii) Diethyl N-[1-methyl-3-(3,4-dimethoxyphenyl)-3-oxopropylidene] aminomalonate (21.0 g.), 400 g. of ethyl polyphosphate and 800 cc. of chloroform were refluxed for 20 hrs. The reaction mixture was treated in the same way as described in Example 102(ii) to obtain ethyl 2-methyl - 4 - (3,4 - dimethoxyphenyl)pyrrole - 5 - carboxylate, M.P. 122–123° C.

*Analysis.*—Calculated for $C_{16}H_{19}NO_4$: C, 66.42; H, 6.42; N, 4.84. Found: C, 66.12; H, 6.60; N, 4.87.

Compounds of this invention other than those described in the typical examples have been prepared. Among such compounds so produced are the following with their melting points:

3-(2-nitro - 3 - chlorphenyl) - 2 - methylpyrrole, M.P. 102.5–103° C.;

3-(2 - nitro - 3 - chlorophenyl)-2-methylpyrrole-5-carboxylic acid, which was identified by decarboxylating it into 3-(2-nitro - 3 - chlorophenyl)-2-methylpyrrole, M.P. 102.5–103° C.;

3-(-nitro - 3 - chlorophenyl)-pyrrole-2-carboxylic acid, which was identified by decarboxylating it into 3-(2-nitro-3-chlorophenyl)-pyrrole, M.P. 119–120° C.;

3-(2-nitro - 3 - chlorophenyl)-pyrrole-5-carboxylic acid, M.P. 286° C. (decomposition);

Methyl 3-(2-nitro-3-chlorophenyl)-pyrrole-5-carboxylate, M.P. 156–158° C.;

Methyl 3 - (2-nitro-3-chlorophenyl)-2-methylpyrrole-5-carboxylate, M.P. 191–192° C.;

Ethyl 3-(2-nitro - 3 - chlorophenyl)-pyrrole-2-carboxylate, M.P. 191.5–192.5° C.;

Dimethyl 3-(2-nitro-3-chlorophenyl)-pyrrole-2,5-dicarboxylate, M.P. 182–183° C.;

3 - (2 - nitro-3-chlorophenyl)-2-ethoxycarbonylpyrrole-5-carboxylic acid, M.P. 270° C. (decomposition);

Methyl 3 - (2-nitro-3-chlorophenyl)-4-chloropyrrole-5-carboxylate, M.P. 199° C.;

3 - (2-nitro - 3 - chlorophenyl)-4-chloro-2,5-dimethylpyrrole, M.P. 184–186° C. (decomposition);

Methyl 3-(2-nitro - 3 - chlorophenyl)-2-trichloromethyl-4-chloropyrrole - 5 - carboxylate, which was identified by solvolysing it into 3-(2-nitro-3-chlorophenyl)-4-chloro-5-methoxycarbonylpyrrole-2-carboxylic acid, M.P. 279° C. (decomposition); and 3-(2-nitro - 3 - chlorophenyl)-4-chloro-5-methoxycarbonylpyrrole-2-carboxylic acid, M.P. 279° C.

What is claimed is:

1. A compound of the formula

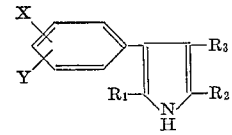

in which

X is hydrogen, chlorine, bromine, nitro or lower alkoxy;
Y is chlorine, bromine, nitro or lower alkoxy;
$R_1$ is hydrogen, lower alkyl, trihalomethyl or —$COOR_4$ in which $R_4$ is hydrogen, lower alkyl or phenyl lower alkyl; $R_2$ is hydrogen lower alkyl, trihalomethyl, or —$COOR_5$ in which $R_5$ is hydrogen, lower alkyl or phenyl lower alkyl; and
$R_3$ is hydrogen, chlorine or bromine; provided that
  (1) when $R_1$ or $R_2$ is trihalomethyl, $R_3$ is chlorine or bromine, and
  (2) when X is nitro, Y is chlorine and one of $R_1$ and $R_2$ is hydrogen, either $R_1$ or $R_2$ is $COOR_4$ (or $COOR_5$).

2. A compound in accordance with claim 1, which compound is 3 - (nitro-chlorophenyl)-4-chloro-5-methylpyrrole-2-carboxylic acid or its lower alkyl ester.

3. A compound in accordance with claim 1, which compound is ethyl 3-(nitro-chlorophenyl)-4-chloro-5-trichloromethylpyrrole-2-carboxylate.

4. A compound in accordance with claim 1, which compound is 3-(nitro-chlorophenyl)-4-chloro(or bromo)- pyrrole-2,5-dicarboxylic acid or its mono- or di-lower alkyl ester.

5. A compound in accordance with claim 1, which compound is 3-(nitro-chlorophenyl)-pyrrole-2,5-dicarboxylic acid.

6. A compound in accordance with claim 1, which compound is 3 - (nitro - chlorophenyl)-4-chloropyrrole-2-(or 5)-carboxylic acid.

7. A compound in accordance with claim 1, which compound is 3 - [chloro(or bromo)-phenyl]-5-methyl-2-carboxylic acid or its lower alkyl esters.

8. A compound in accordance with claim 1, which compound is 3-[chloro(or bromo)-phenyl]-4-chloro-5-trichloromethylpyrrole-2-carboxylic acid lower alkyl ester.

9. A compound in accordance with claim 1, which compound is 3-(chloro-nitro-phenyl)-4-chloro-2,5-di-trichloromethylpyrrole.

10. A compound in accordance with claim 1, which compound is 3-[chloro(or bromo)-phenyl]-4-chloro-pyrrole-2,5-dicarboxylic acid or its mono- or di-lower alkyl esters.

11. A compound in accordance with claim 1, which compound is 3-(nitro-phenyl)-5-methyl pyrrole 2-carboxylic acid or its lower alkyl ester.

12. A compound in accordance with claim 1, which compound is ethyl 3-(nitro-phenyl)-4-chloro-5-trichloromethylpyrrole-2-carboxylate.

13. A compound in accordance with claim 1, which compound is 3-(nitro-phenyl)-4-chloropyrrole-2,5-dicarboxylic acid or its lower alkyl ester.

14. A compound in accordance with claim 1, which compound is 3-(chloro-phenyl)-5-methylpyrrole.

15. A compound in accordance with claim 1, which compound is 3-(nitro-phenyl)-5-methylpyrrole.

16. A compound in accordance with claim 1, which compound is 3-(methoxy-phenyl)-5-methylpyrrole.

17. A compound in accordance with claim 1, which compound is 3-(nitro-chlorophenyl)-2,5-dimethylpyrrole.

18. A compound in accordance with claim 1, which compound is 3-[chloro(or bromo)-phenyl]-4-chloropyrrole.

19. A compound in accordance with claim 1, which compound is 3 - (nitro-chlorophenyl)-5-methylpyrrole-2-carboxylic acid or its lower alkyl ester.

20. A process for preparing a compound (I) having the formula:

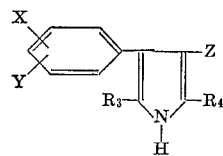

wherein X is hydrogen, chlorine, bromine, nitro or lower alkoxy; Y is chlorine, bromine, nitro or lower alkoxy; Z is chlorine or bromine; and one of $R_3$ and $R_4$ is hydrogen and the other is hydrogen or lower alkoxycarbonyl, said process comprising decarboxylating a compound (II) having the formula:

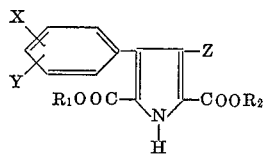

wherein X, Y and Z are the same meaning as defined above, and one of $R_1$ and $R_2$ is hydrogen and the other hydrogen or lower alkyl, by heating in the presence of quinoline, picoline or dimethylaniline.

21. A process of claim 20 in which X, Y and Z of compounds I and II are respectively 2-nitro, 3-chlorine and chlorine and said compound II is decarboxylated at a temperature of 130° C. to 270° C.

References Cited

Arima et al.: Arg. Biol. Chem., vol. 28, No. 8 pp. 575–576 (1964).

NICHOLAS S. RIZZO, *Primary Examiner.*

J. NARCAVAGE, *Assistant Examiner.*

U.S. Cl. X.R.

260—326.3, 326.5, 326.9, 471; 424—274, 309